United States Patent [19]
Teramura et al.

[11] Patent Number: 5,425,436
[45] Date of Patent: Jun. 20, 1995

[54] AUTOMOTIVE SUSPENSION CONTROL SYSTEM UTILIZING VARIABLE DAMPING FORCE SHOCK ABSORBER

[75] Inventors: Eiji Teramura, Okazaki; Shuichi Matsumoto, Oobu; Masatoshi Kuroyanagi, Kariya; Kinji Hodaira, Okazaki, all of Japan

[73] Assignee: Nippondenso Co., Ltd., Kariya, Japan

[21] Appl. No.: 112,243

[22] Filed: Aug. 25, 1993

[30] Foreign Application Priority Data

Aug. 26, 1992 [JP] Japan .................. 4-252271

[51] Int. Cl.⁶ ............................... F16F 4/49
[52] U.S. Cl. ................... 788/280; 188/299; 280/707; 280/714
[58] Field of Search .......... 188/299, 280, 322.15, 188/281, 282, 316, 317, 322.22; 280/707, 714

[56] References Cited

U.S. PATENT DOCUMENTS

| | | | |
|---|---|---|---|
| 3,807,678 | 4/1974 | Karnopp et al. | |
| 4,923,038 | 5/1990 | Lizell | 188/299 |
| 4,936,423 | 6/1990 | Karnopp | |
| 5,133,434 | 7/1992 | Kikushima et al. | 188/299 |
| 5,269,557 | 12/1993 | Butsuen et al. | 280/707 |
| 5,285,876 | 2/1994 | Shimizu et al. | 188/299 |
| 5,293,969 | 3/1994 | Yamaoka et al. | 188/299 |
| 5,293,971 | 3/1994 | Kanari et al. | 188/299 |

FOREIGN PATENT DOCUMENTS

| | | |
|---|---|---|
| 61-75007 | 4/1986 | Japan . |
| 61-163011 | 7/1986 | Japan . |
| 62-43909 | 3/1987 | Japan . |
| 62-120008 | 7/1987 | Japan . |
| 62-253507 | 11/1987 | Japan . |
| 1502972 | 10/1989 | Japan . |
| 342319 | 2/1991 | Japan . |
| 3227711 | 10/1991 | Japan . |
| 8806983 | 9/1988 | WIPO . |

*Primary Examiner*—Andres Kashnikow
*Assistant Examiner*—Lee W. Young
*Attorney, Agent, or Firm*—Cushman, Darby & Cushman

[57] ABSTRACT

A variable damping force shock absorber control system for an automotive vehicle is provided. This control system includes a variable damping force shock absorber adapted to have a plurality of damping modes of operation each assuming different damping characteristics, a vertical acceleration sensor for detecting vertical acceleration acting on a vehicle body, and a control unit. The control unit mathematically determines vertical speed of the vehicle body based on the vertical acceleration to select one of the damping modes based on the vertical speed, and determines the amount of damping force in each damping mode according to a vibratory condition indicative parameter which is varied as a function of a variation in amplitude of the vertical acceleration.

35 Claims, 47 Drawing Sheets

FIG. 15
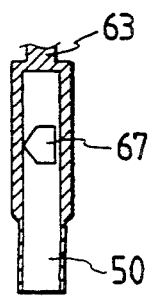
FIG. 16(a)         FIG. 16(b)
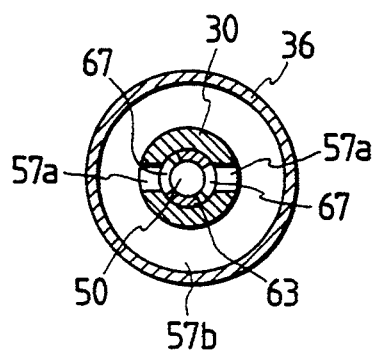   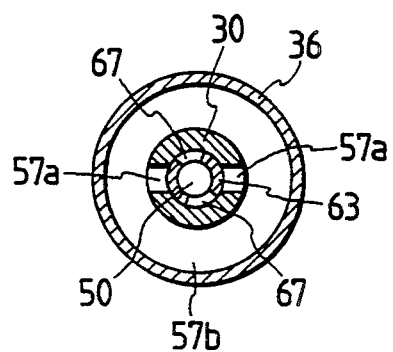

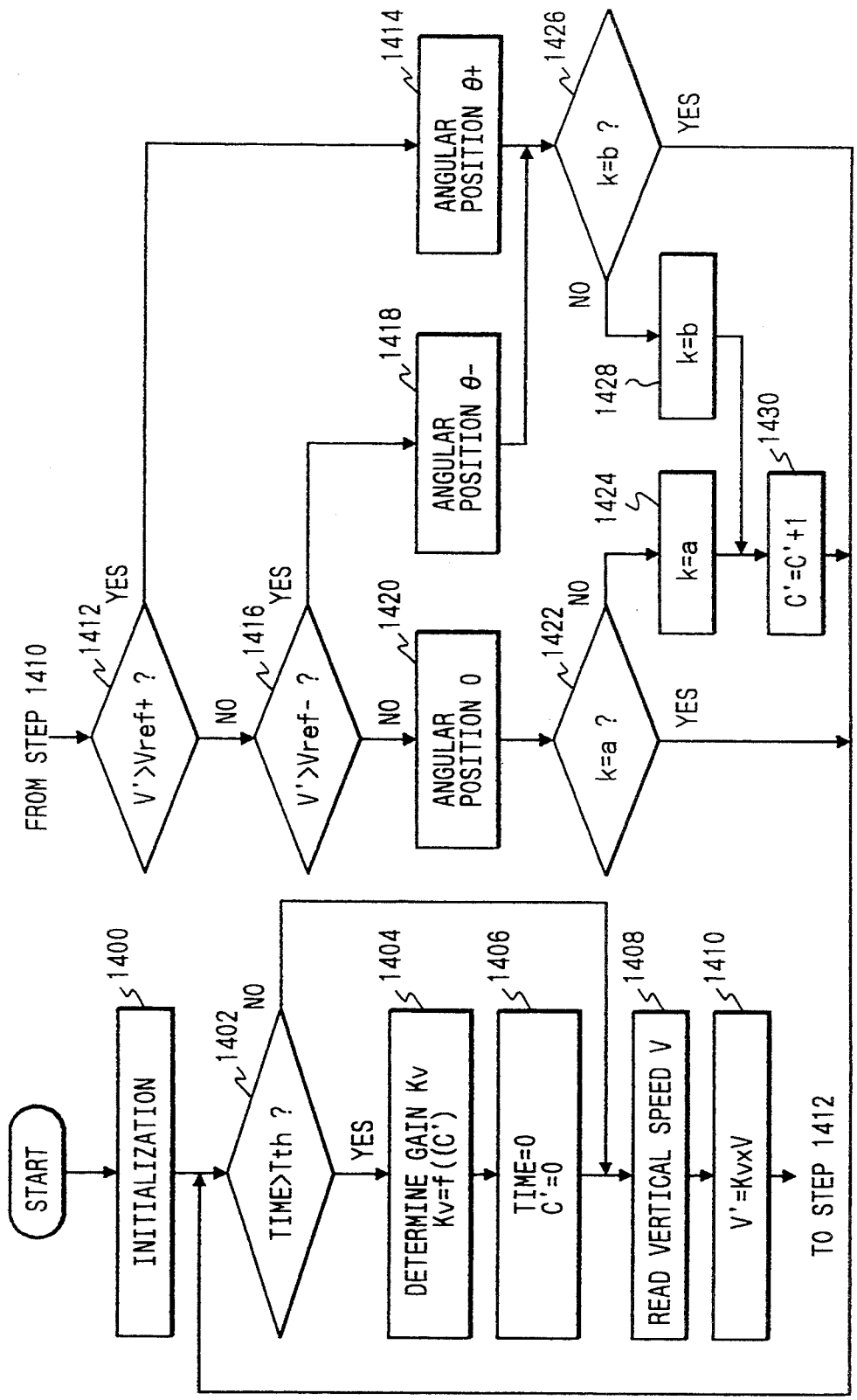

AUTOMOTIVE SUSPENSION CONTROL SYSTEM UTILIZING VARIABLE DAMPING FORCE SHOCK ABSORBER

BACKGROUND OF THE INVENTION

1. Field of The Invention

The present invention relates generally to an automotive suspension control system. More particularly, the invention is directed to a variable damping force shock absorber control system which is operable to modify damping characteristics based on vibratory energy transmitted from a road surface to a vehicle body for assuring riding comfort.

2. Description of The Prior Art

U.S. Pat. No. 3,807,678 to Karnopp et al., issued on Apr. 30, 1974, discloses a semi-active suspension system which establishes damping characteristics substantially corresponding to those in so-called skyhook dampers. This prior art system is designed to control a shock absorber in a manner wherein when a sprung vertical speed $dx2$ and a relative speed $dx2$-$dx1$ between sprung and unsprung portions of a vehicle are in the same direction, that is, when a vehicle body and a wheel move in opposite directions or when the vehicle body moves faster than the wheel in the same direction, a damping force is increased, while when the sprung vertical speed $dx2$ and the relative speed $dx2$-$dx1$ in opposite directions, the damping force is decreased.

Therefore, in the Karnopp et al. system, when although the relative speed $dx2$-$dx1$ is in a negative direction (i.e., during a compression, or bound stroke of the shock absorber), the sprung vertical speed $dx2$ is in the negative direction (i.e., a downward direction), the shock absorber is controlled to assume a greater damping force.

Additionally, Japanese Patent First Publication No. 1-502972 teaches a shock absorber control system which utilizes a sprung acceleration sensor and a stroke sensor. The outputs of the acceleration sensor are integrated to determine a sprung vertical speed $dx2$. The outputs of the strike sensor are differentiated to derive a relative speed $dx2$-$dx1$ between sprung and unsprung portions of a vehicle. When a direction of the sprung vertical speed $dx2$ or the relative speed $dx2$-$dx1$ has been changed damping characteristics are modified.

Such a conventional shock absorber control system, however, has suffered from a drawback in that when vertical vibratory motion of the vehicle body is increased, a control valve is actuated to control the shock absorber to assume firm damping characteristics, therefore, when high-frequency vibrations due to fine protrusions on a road surface are input to the vehicle body, the actuation of the control valve is increased so that the high-frequency vibrations are undesirably transmitted to vehicle occupancies as a result of provision of the firm damping characteristics in favor of damping the vibratory motion of the vehicle body. Accordingly, a great deal of power is consumed and the durability of the control valve is reduced. In addition, it is difficult to damp the sprung vibrations while reducing transmission of the vibrations to the vehicle body.

SUMMARY OF THE INVENTION

It is therefore a principal object of the present invention to avoid the disadvantages of the prior art.

It is another object of the invention to provide a control System for a variable damping force shock absorber which serves to reduce the transmission of mechanical energy in the form of shock and vibration between a vehicle body and a wheel due to fine irregularities of a road surface while suppressing vibratory motion of the vehicle body effectively.

According to one aspect of the present invention, there is provided a variable damping force shock absorber control system which comprises a variable damping force shock absorber including a cylinder filled with working fluid, a piston, slidably disposed within the cylinder, defining upper and lower working chambers, a first fluid passage allowing the working fluid to flow only in a direction from the upper to lower chambers, a second fluid passage allowing the working fluid to flow only in a direction from the lower to upper chambers, and valve means, disposed in the first and second fluid passages, for modifying one of fluid passage areas of the first and second fluid passages while maintaining the other constant, a vibration level determining means for determining a vibration level of a sprung portion of a vehicle body, a vertical speed determining means for determining vertical speed of the sprung portion of the vehicle body, a mode selecting means for actuating the valve means of the variable damping force shock absorber to select one of first, second, and third modes of operation of the shock absorber according to the vertical speed determined by the vertical speed determining means, the first mode being such that a damping force during an extension stroke of the shock absorber is modified to a greater value while maintaining a damping force during a compression stroke at a smaller value, the second mode being such that the damping force during the compression stroke of the shock absorber is modified to a greater value while maintaining the damping force during the extension stroke at a smaller value, the third mode being such that the damping forces during both compression and extension strokes are set to the smaller values, and a damping characteristic modifying means for modifying damping characteristics during the extension stroke in the first mode and during the compression stroke in the second mode according to a variation in the vibration level determined by the vibration level determining means.

According to another aspect of the present invention, there is provided a variable damping force shock absorber control system which comprises a variable damping force shock absorber including a cylinder filled with working fluid, a piston, slidably disposed within the cylinder, defining upper and lower working chambers, a first fluid passage allowing the working fluid to flow only in a direction from the upper to lower chambers, a second fluid passage, having a preselected greater passage area, allowing the working fluid to flow only in a direction from the lower to upper chambers, and valve means, disposed in the first and second fluid passages, for modifying a passage area of the first fluid passage, a vibration level determining means for determining a vibration level of a sprung portion of a vehicle body, a vertical speed determining means for determining vertical speed of the sprung portion of the vehicle body, a mode selecting means for actuating the valve means of the variable damping force shock absorber to switch between first and third modes of operation of the shock absorber according to the vertical speed determined by the vertical speed determining means, the first mode being such that a damping force during an extension stroke of the shock absorber is modified to a greater value while maintaining a damping force during a compression stroke at a smaller value, the third mode being such that the damping forces during both compression and extension strokes are set to the smaller values, and a damping characteristic modifying means for modifying damping characteristics during the extension stroke in the first mode according to a variation in the vibration level determined by said vibration level determining means.

According to a further aspect of the invention, there is provided a variable damping force shock absorber control system for an automotive vehicle which comprises a variable damping force shock absorber adapted to have a plurality of damping modes of operation each assuming different damping characteristics, a vertical acceleration determining means for determining vertical acceleration acting on a sprung portion of the vehicle to provide a signal indicative thereof, a vertical speed determining means for determining vertical speed of the sprung portion of the vehicle to provide a signal indicative thereof, a vibratory condition determining means, responsive to the signal from the vertical acceleration determining means, for determining a vibratory condition indicative parameter as a function of a variation in amplitude of the vertical acceleration, a mode selecting means, responsive to the signal from the vertical speed determining means, for selecting one of the plurality of damping modes of operation of the variable damping force shock absorber according to the vertical speed, and a damping force modifying means for modifying a damping force in each damping mode of operation of the variable damping force shock absorber in a preselected relation to the vibratory condition indicative parameter determined by the vibratory condition determining means.

BRIEF DESCRIPTION OF THE DRAWINGS

The present invention will be understood from the detailed description given hereinbelow and from the accompanying drawings of the preferred embodiments of the invention, which, however, should not be taken to limit the invention to the specific embodiment but are for explanation and understanding only.

In the drawings:

FIG. 15 is a vertical cross-sectional view which shows a control valve serving to modify a damping coefficient of the variable damping force shock absorber, as shown in FIG. 14.

FIG. 16(a) and 16(b) are horizontal cross-sectional views taken along the line A—A in FIG. 14.

FIG. 52 is a flowchart which shows a program performed by a control unit which modifies a gain Kv for correcting vertical speed V according to the number of times the damping characteristic mode has been changed.

DESCRIPTION OF THE PREFERRED EMBODIMENT

Figure 1A:
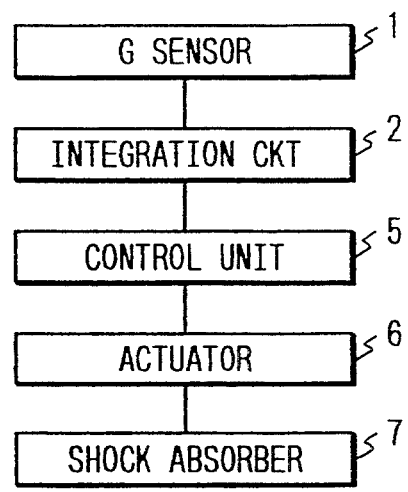
FIGS. 1(a) and 1(b) are block diagrams which show a variable damping force shock absorber control system according to the present invention.
Figure 1B:
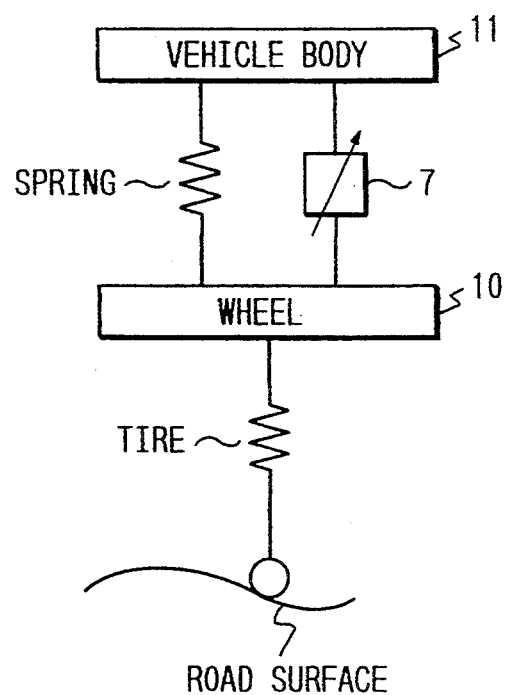

Referring now to the drawings, wherein like numbers refer to like parts in several views, particularly to FIGS. 1(a) and 1(b), there is shown a suspension control system for automotive vehicles according to the present invention which is provided with a shock absorber control system adapted for controlling the transmission of shock and vibratory energy between a road wheel 10 and a vehicle body 11.

The shock absorber control system includes generally an acceleration sensor 1, an integration circuit 2, a control unit 5, an actuator 6, and a variable damping Force shock absorber 7.

The acceleration sensor I is of a strain gage type and is mounted on a vehicle body portion adjacent a suspension upper support. The acceleration sensor 1 is operable to detect vertical acceleration acting on a sprung portion (i.e., the vehicle body) of the vehicle to provide a vertical acceleration signal. The integration circuit 2 integrates the vertical acceleration signal to derive a vertical Speed signal V (=d×2) indicative of vertical speed of the sprung portion. The control unit 5 is provided with a mathematical logical circuit which is responsive to the vertical speed signal V to provide a control signal to the actuator 6 which operates a control valve, as will be described hereinafter in detail, disposed in the shock absorber 7.

Referring to FIGS. 2 to 5, a cross-sectional structure of the variable damping force shock absorber 7 is shown. The shock absorber 7 includes a main piston 20 which defines an upper chamber 2a and a lower chamber 2b in a cylinder tube 10. The main piston 20 is secured through a spacer to a piston rod C36 which is inserted through the central portion of the piston 20. A piston rod A30 is screwed at its lower end portion into a piston rod B35 which is then connected to the piston rod C36.

Between the piston rods A30 and B35, communication passages 56a, 56b, and 56c are defined which completes a compression phase fluid passage 56 having a relatively great fluid passage area. The communication passage 56b is hermetically sealed by two O-rings 90.

A spring 54 and a plate type check valve 58 are arranged between the piston rods A30 and B35. The spring 54 is placed between a flange portion of the piston rod A30 and the check Valve 58 on an upper surface of the piston rod B35 to urge the check valve downward.

With the above arrangement, the check valve 58 serves to selectively establish and block fluid communication between the upper chamber 2a and the compression phase fluid passage 56 to allow fluid flow from a control valve 60 to the upper chamber 2a only during a bounding, or compression stroke of the shock absorber.

Between the piston rods B35 and C36, a spring chamber 57b and communication passages 57a and 57c are defined which completes an extension phase fluid passage 57 having a relatively great fluid passage area. The spring chamber 57b is hermetically sealed by three O-rings 90 and accommodates therein a spring 5S and a plate type check valve 59.

The spring 55 is placed between a recessed portion of the piston rod B35 and the check valve 59 on an upper surface of the piston rod C36 to urge the check valve downward.

With the above arrangement, the check valve 59 serves to selectively establish and block fluid communication between the upper chamber 2a and the extension phase fluid passage 57 to allow fluid flow from the upper chamber 2a to the control valve 60 only during a rebounding, or extension stroke of the shock absorber.

A main compression phase fluid passage 42 and a main extension phase fluid passage 42 which have a relatively small fluid passage area are formed through the main piston 20 for communicating between the upper and lower chambers 2a and 2b.

The main compression phase fluid passage 41 is blocked by a plate type check valve 48 arranged on an upper surface of the piston 20, while the main extension phase fluid passage 42 is blocked by a plate type check valve 49 arranged on a lower surface of the piston 20.

Defined through the piston rod C36 is a subfluid passage 50 which makes it possible to establish fluid communication between the upper and lower chambers 2a and 2b.

The control valve 60 is rotatably arranged in fluid tight engagement with an inner wall of a cylindrical lower portion of the piston rod A30. The control valve 60 includes a fine outer solid rod which is connected to the actuator 6. Bushings 31 and 32 are pressed into the piston rod A30 in engagement with the upper rod of the control valve 60 allowing it to rotate in the piston rod A30. An O-ring 90 is arranged under the bushing 31 for providing fluid tight seal with the outside.

With the above arrangement, operating the actuator 6 causes the control valve 60 to rotate in its circumferential direction in the piston rod A30.

Figure 3:
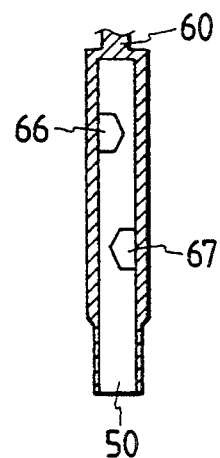
FIG. 3 is a vertical cross-sectional view which shows a control valve serving to modify a damping coefficient of a variable damping force shock absorber of the present invention.

FIG. 3 shows a vertical cross-sectional structure of the control valve 60.

As can be seen in the drawing, the control valve 60 includes a hollow cylindrical lower portion which forms part of the sub-fluid passage 50.

Figure 2:
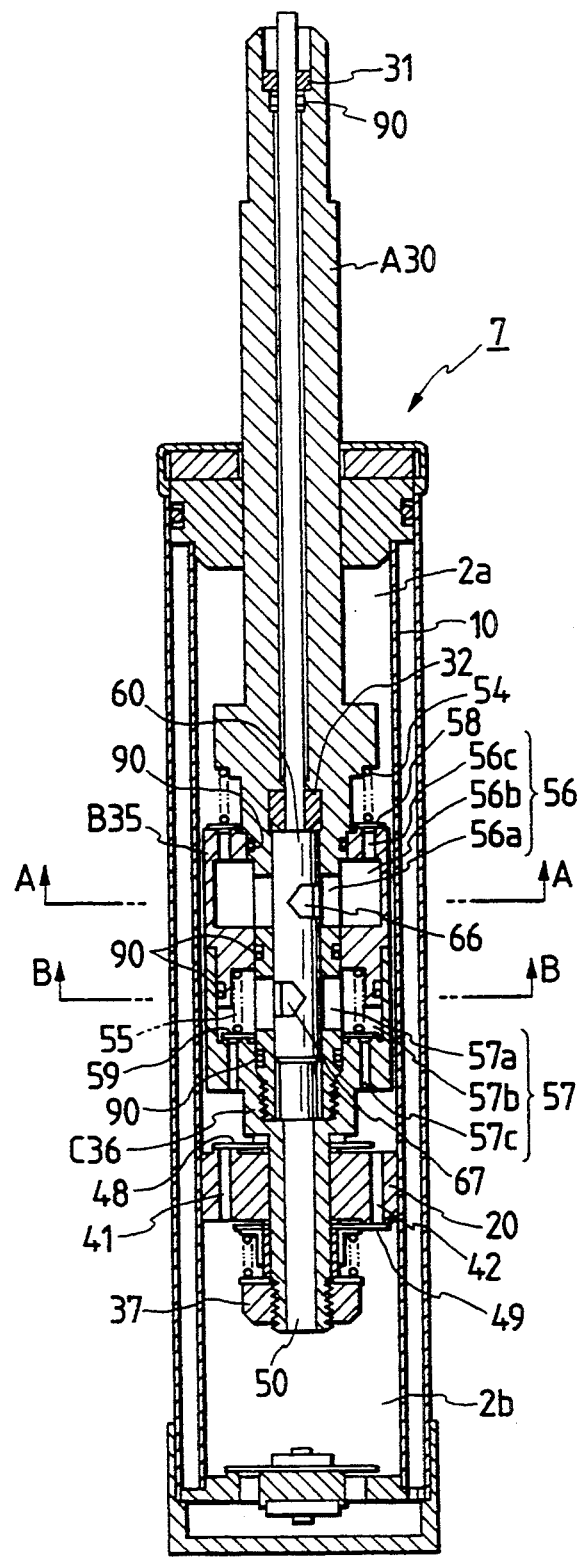
FIG. 2 is a vertical cross-sectional view which shows a variable damping force shock absorber of the present invention.
Figure 4A:
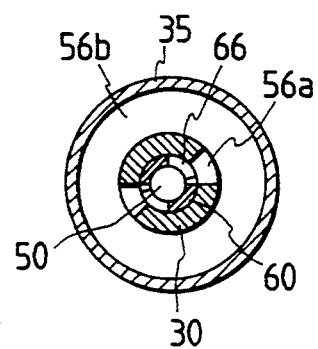
FIG. 4(a) is a horizontal cross-sectional view taken along the line A—A in FIG. 2.
Figure 4B:
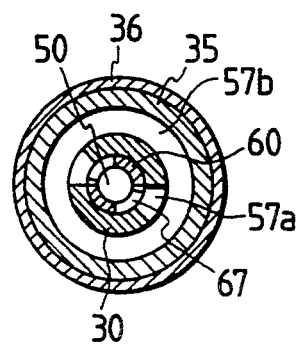
FIG. 4(b) is a horizontal cross-sectional view taken along the line B—B in FIG. 2.

FIG. 4(a) is a horizontal cross sectional view taken along the lines A—A in FIG. 2. FIG. 4(b) is a horizontal cross sectional view taken along the line B—B in FIG. 2.

As is clear from the drawings, the control valve 60 includes a pair of polygonal compression phase openings 66 and a pair of polygonal extension phase openings 67. The compression phase openings 66 serve to selectively establish or block fluid communication between the sub-fluid passage 50 and the compression phase fluid passage 56 according to the rotation of the control valve 60. The extension phase openings 67 also serve to selectively establish or block fluid communication between the sub-fluid passage 50 and the extension phase fluid passage 57 according to the rotation of the control valve 60.

Figure 5:
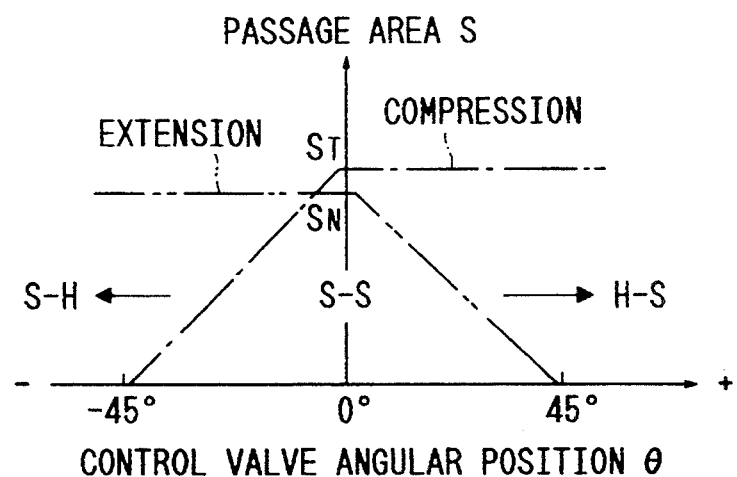
FIG. 5 is a graph which shows a relation between an angular position of a control valve in a variable damping force shock absorber and a fluid passage area S of the control valve.

The compression phase openings 66 are, as can be seen in FIG. 3, so arranged as to register with the communication passage 56a, while the extension phase openings 67 are so arranged as to register with the communication passage 57a. As shown in FIG. 5, according to an angular position $\theta$ of the control valve 60, a communication passage area S is varied. $S_N$ shows a maximum communication passage area between the extension phase openings 67 and the communication passage 57a, which determines a minimum damping force during an extension stroke. $S_T$ represents a maximum communication passage area between the compression phase openings 66 and the communication passage 56a, which determines a minimum damping force during a compression stroke. The relation between the communication passage areas $S_N$ and $S_T$ may be optionally selected. For example, it is preferable that the communication passage area S be varied either linearly or variably from zero to the maximums $S_N$ or $S_T$.

With the above arrangement, when the control valve 60 is in a position as shown in FIGS. 4(a) and (b), it will cause the fluid communications to be established between the compression phase fluid passage 56 and the sub-fluid passage 50 and between the extension phase fluid passage 57 and the sub-fluid passage 50. Therefore, when the working fluid flows from the upper chamber 2a to the lower chamber 2b, it passes substantially through the extension phase fluid passage 57 having the relatively great passage area. Alternatively, when the working fluid flow is directed from the lower chamber 2b to the upper chamber 2a, the working fluid passes substantially through the compression phase fluid passage 56 having the relatively great passage area. This produces a smaller damping coefficient, or damping force during both compression and extension strokes.

Additionally, rotation of the control valve 60 at approximately forty-five degrees (45°) in a clockwise direction from the position as shown in FIGS. 4(a) and 4(b) causes the fluid communication between the extension phase fluid passage 57 and the sub-fluid passage 50 to be blocked while maintaining the fluid communication between the compression phase fluid passage 56 and the sub-fluid passage 50. Thus, When the working fluid flows from the upper chamber 2a to the lower chamber 2b, it passes substantially through the main extension phase fluid passage 42 having the relatively smaller passage area. Alternatively, when the working fluid flow is directed from the lower chamber 2b to the upper chamber 2a, the working fluid passes substantially through the compression phase fluid passage 56 having the relatively great passage area. This produces a greater damping coefficient, or damping force during the extension stroke, while a smaller damping coefficient, or damping force is created during the compression stroke.

Alternatively, when the control valve 60 rotates at approximately forty-five degrees (45) in a counterclockwise direction from the position as shown in FIGS. 4(a) and 4(b), it will cause the fluid is communication between the compression phase fluid passage 56 and the sub-fluid passage 50 to be blocked while maintaining the fluid communication between the extension phase fluid passage 57 and the sub-fluid passage 50. Thus, when the working fluid flows from the upper chamber 2a to the lower chamber 2b, it passes substantially through the extension phase fluid passage 57 having the relatively greater passage area. Conversely, when the working fluid flow is directed from the lower chamber 2b to the upper chamber 2a, the working fluid passes substantially through the main compression phase fluid passage 41 having the relatively smaller passage area. This produces the smaller damping force during the extension stroke and the greater damping force during the compression stroke.

As discussed above, by operating the actuator 6 to modify the angular position of the control valve 60, the communication passage areas between the sub-fluid passage 50 and the compression phase fluid passage 56 and between the sub-fluid passage 50 and the extension phase fluid passage 57 are varied, thereby modifying damping characteristics of the shock absorber to assume the greater damping force during either one of the compression and extension strokes while maintaining the smaller damping force during the other stroke.

Hereinafter, an operation of the variable damping force shock absorber controlled by the control unit 5 will be described in detail. In the following discussion, it is assumed that parameters such as displacement, speed, and acceleration of the wheel 10 and the vehicle body 11 represent positive (+) in an upward direction. Additionally, under the control of this embodiment, the shock absorber, when serving to damp vibratory motion of the vehicle body, produces the greater damping force, while it produces the smaller damping force when allowing the vibratory motion of the vehicle body to to excited.

Figure 6:
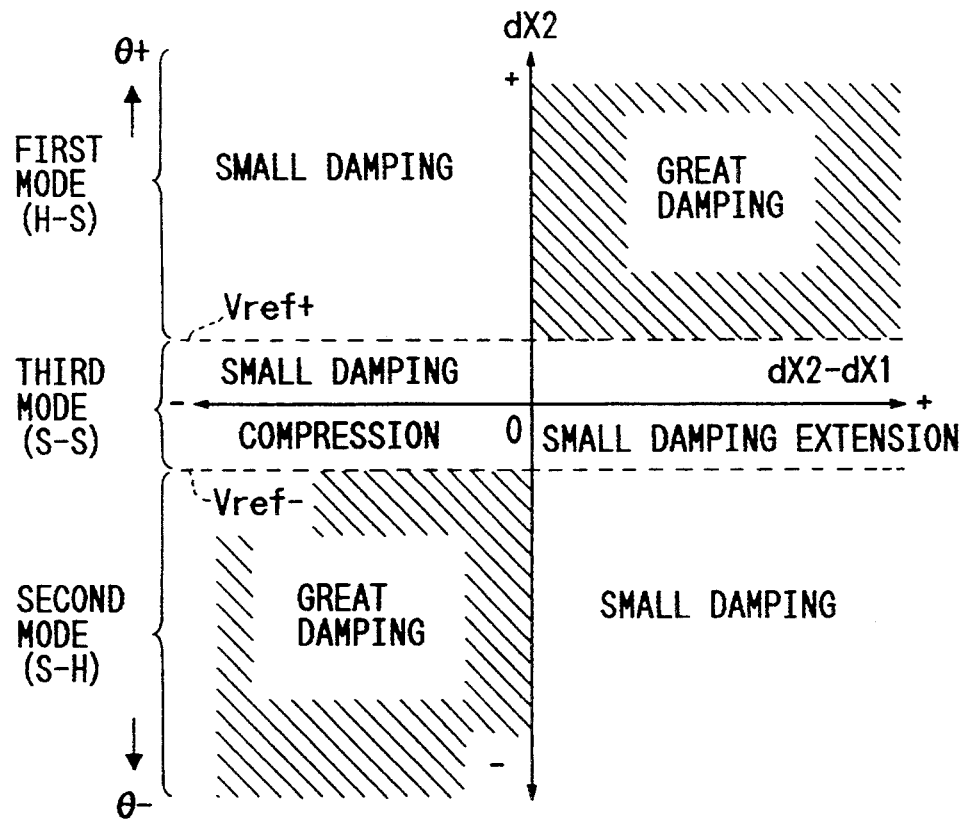
FIG. 6 is a graph which shows damping characteristics of a variable damping force shock absorber relative to vertical speed $dX2$ during compression and extension strokes.

In the above conditions, the relations of the damping characteristics with the sprung vertical speed V (=d×2) and the relative speed d×2-d×1 between the sprung and unsprung portions are provided as shown in FIG. 6.

A first mode (hereinafter, also referred to as an H-S mode), as shown in the drawing, is established when the control valve 60 is placed at a positive angle $\theta+$ to assume the damping characteristics wherein the damping force is increased during the extension stroke, while it is decreased during the compression stroke. A second mode (hereinafter, also referred to as an S-H mode) is established when the control valve 60 is placed at a negative angle $\theta-$ to assume the damping characteristics wherein the greater damping force is produced during the compression stroke and the smaller damping force is produced during the extension stroke. A third mode (hereinafter, also referred to as an S-S mode) is established when the control valve 60 is placed at an angle of about zero (0°) to assume the damping characteristics wherein the smaller damping force is produced during both the compression and extension strokes.

In operation, when the vehicle is traveling at a high speed, the angles $\theta+$ and $\theta-$ are increased respectively to modify the damping force to a greater value for suppressing vehicle attitude change effectively in favor of handling ability. Alternatively, when the vehicle is traveling at a low speed, the angles $\theta+$ and $\theta-$ are decreased respectively to modify the damping force to a smaller value for avoiding high-frequency vibrations from being input from a road surface which may be caused when the greater damping force is provided to counteract great vertical motion of the vehicle body.

Additionally, when the vehicle is accelerating, braking, or cornering, causing greater longitudinal or lateral accelerations to act on the vehicle body 11, the angles $\theta+$ and $\theta-$ of the control valve 60 are increased respectively to modify the damping force to the greater value for suppressing vehicle attitude change effectively. Alternatively, when the longitudinal or lateral accelerations are relatively small, the angles $\theta+$ and $\theta-$ are decreased respectively to modify the damping force to the smaller value for assuring riding comfort.

Figure 7:
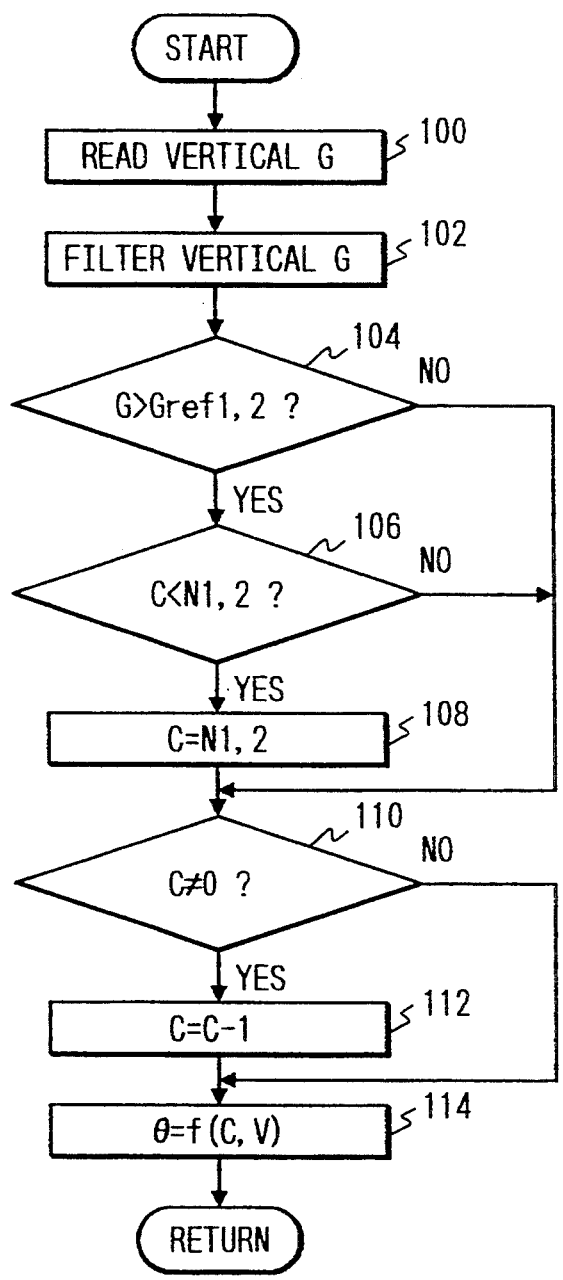
FIG. 7 is a flowchart which shows a program or logical steps performed by a control unit.

Referring to FIG. 7, there is shown a flowchart of program or sequence of logical steps performed by the control unit 5.

After entering the program, the routine proceeds to step 100 wherein the sprung vertical acceleration G monitored by the acceleration sensor 1 is read in the control unit 5.

The routine then proceeds to step 102 wherein the sprung vertical acceleration G is high-pass filtered so that greatly lower frequency components contained therein are removed The routine then proceeds to step 104 wherein it is determined whether the vertical acceleration G derived in step 102 is greater than preselected threshold values $G_{ref1}$ and $G_{ref2}$ or not. If a YES answer is obtained, concluding that the vertical acceleration G exceeds either one of the threshold values $G_{ref1}$ and $G_{ref2}$, the routine then proceeds to step 106 wherein it is determined whether a counter value C is smaller than a value Ni (i=1, 2) which is in a positive correlation with the threshold value $G_{refi}$. Note that Ni represents an integral number (e.g., N1=10, N2=20).

Figure 8:
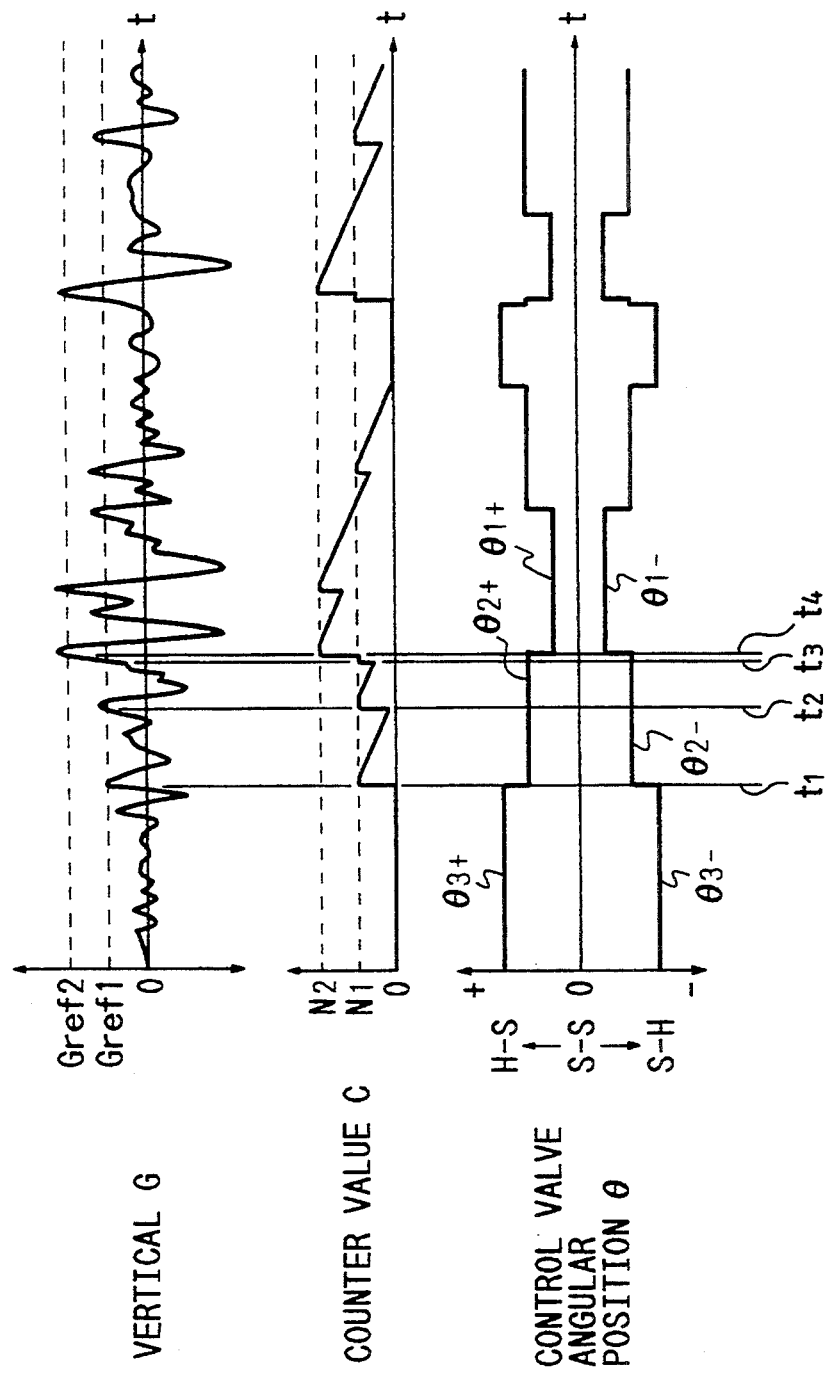
FIG. 8 is a time-chart which corresponds to the flowchart in FIG. 7.

If the counter value C represents zero or a value which is mathematically processed in step 112, as will be described hereinafter, the routine then proceeds to step 108 wherein, the counter value C is set to the value Ni corresponding to the threshold value $G_{refi}$ over which the vertical acceleration G has passed. For example, as shown in FIG. 8, the counter value C is set to N1 (=10) at times $t_1$, $t_2$, and $t_3$ when the vertical acceleration G has exceeded the threshold value $G_{ref1}$. At a time $t_4$ when the vertical acceleration G has exceeded the threshold value $G_{ref2}$, the counter value is set to N2 (=20). Afterwards, the routine proceeds to step 110.

If the vertical acceleration G is smaller than the threshold values $G_{ref1}$ and $G_{ref2}$ in step 104 or the counter value C is not smaller than N1 or N2 in step 106, the routine then proceeds to step 110 wherein it is determined whether the counter value C represent a value other than zero or not. If a YES answer is obtained (C≠0), the routine then proceeds to step 112 wherein the counter value C is subtracted by one (C=C−1), after which the routine then proceeds to step 114. Thus, it will be appreciated that the same damping force (i.e., the same angular position $\theta$ of the control valve 60) is maintained for a preselected period of time as long as the sprung vertical acceleration does not exceeds the counter value C.

Alternatively, if a NO answer is obtained in step 110 (C=0), the routine then proceeds directly to step 114. In step 114, an angular direction ($\theta+$, $\theta-$) of the control valve 60 is, as shown in FIG. 6, determined based on the sprung vertical speed V and the threshold values $V_{ref+}$ or $V_{ref-}$, and the amount of rotation, or angular position ($\theta1$, $\theta2$, or $\theta3$) thereof is then determined based on the counter value C.

As can be seen in FIG. 8, the counter value C is varied substantially along an envelope of the amplitude of the sprung vertical acceleration G. In other words, the counter value C represents a parameter which varies as a function of variation in amplitude of the sprung vertical acceleration G to develop a negative correlation with $\theta+$ and a positive correlation with $\theta-$ where $\theta+$ is greater than zero ($\theta>0$) and $\theta-$ is smaller than zero ($\theta<0$). Thus, when the counter C represents zero, the control valve 60 is rotated at a maximum angle ($\theta3+$, $\theta3-$) in the first mode (H-S) and the second mode (S-H). When the counter value C is greater than zero and smaller than or equal to N1, the control valve 60 is rotated at a middle angle ($\theta2+$, $\theta2-$). When the counter value C is greater than N1 and smaller than or equal to N2, the control valve 60 is rotated at a minimum angle ($\theta1+$, $\theta1-$).

It will be appreciated that the counter value C which is determined based on the comparison of the sprung vertical acceleration G (or its high frequency components) with the preselected threshold values $G_{refi}$ substantially represents the correlation with the variation in peak level of high-frequency components of the sprung vertical acceleration G.

Accordingly, in the shock absorber control system of the embodiment, when traveling on an uneven road surface causing a greater vertical acceleration to act on the vehicle body, although the vertical speeds V are the same, the damping characteristics of the shock absorber is adjusted to assume the smaller or softer damping, thereby assuring good riding comfort.

Figure 9:
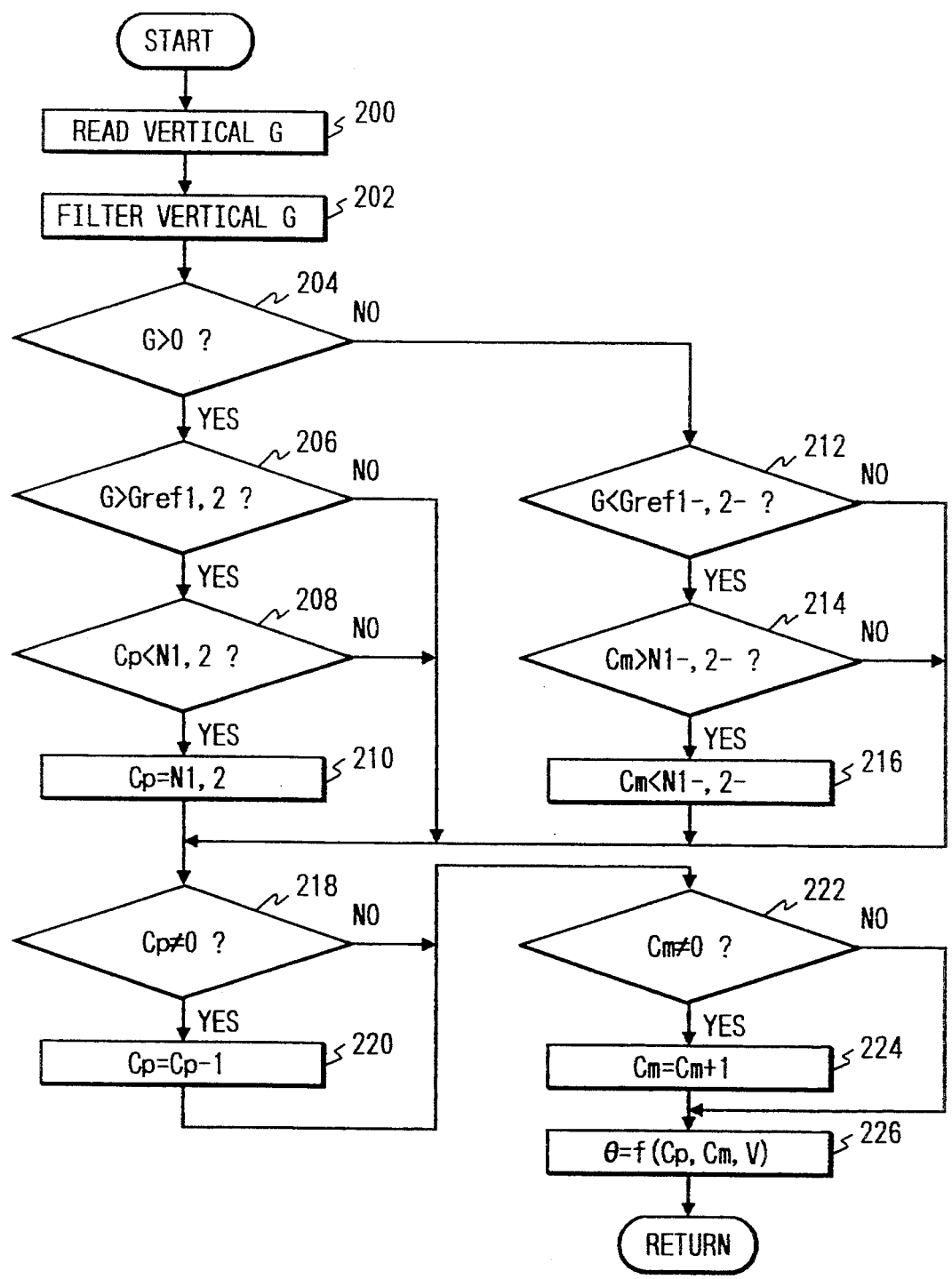
FIG. 9 is a flowchart which shows a second embodiment of a program performed by a control unit.

Referring to FIG. 9, there is shown a flowchart of a second embodiment according to the present invention which represents logical steps performed by the control unit 5.

This embodiment is different from the above first embodiment in that two acceleration threshold values $G_{ref1}$ and $G_{ref2}$ are provided in the positive direction (i.e., an upward direction) of the sprung vertical acceleration G, while one acceleration threshold value $G_{ref1-}$ is provided in the negative direction (i.e., a downward direction).

In step 204, it is determined whether the sprung vertical acceleration G is greater than zero or not. If a YES answer is obtained, the routine then proceeds to step 206 wherein it is determined whether the sprung vertical acceleration G exceeds the acceleration threshold values $G_{ref1}$ or $G_{ref2}$. If a YES answer is obtained, the routine then proceeds to step 208 wherein it is determined whether a counter value $C_P$ is smaller than a value Ni (N1, N2). If a YES answer is obtained, the routine then proceeds to step 210 the counter value $C_p$ is set to the value Ni. Alternatively, if a NO answer is obtained in step 204, the routine then proceeds to step 212 wherein it is determined whether the sprung vertical acceleration G is lower than the acceleration threshold values $G_{ref1-}$ or not. If a YES answer is obtained, the routine then proceeds to step 214 wherein a counter value $C_m$ is greater than the value Ni. If a YES answer is obtained, the routine then proceeds to step 216 wherein the counter value $C_m$ is set to the value Ni.

Figure 10:
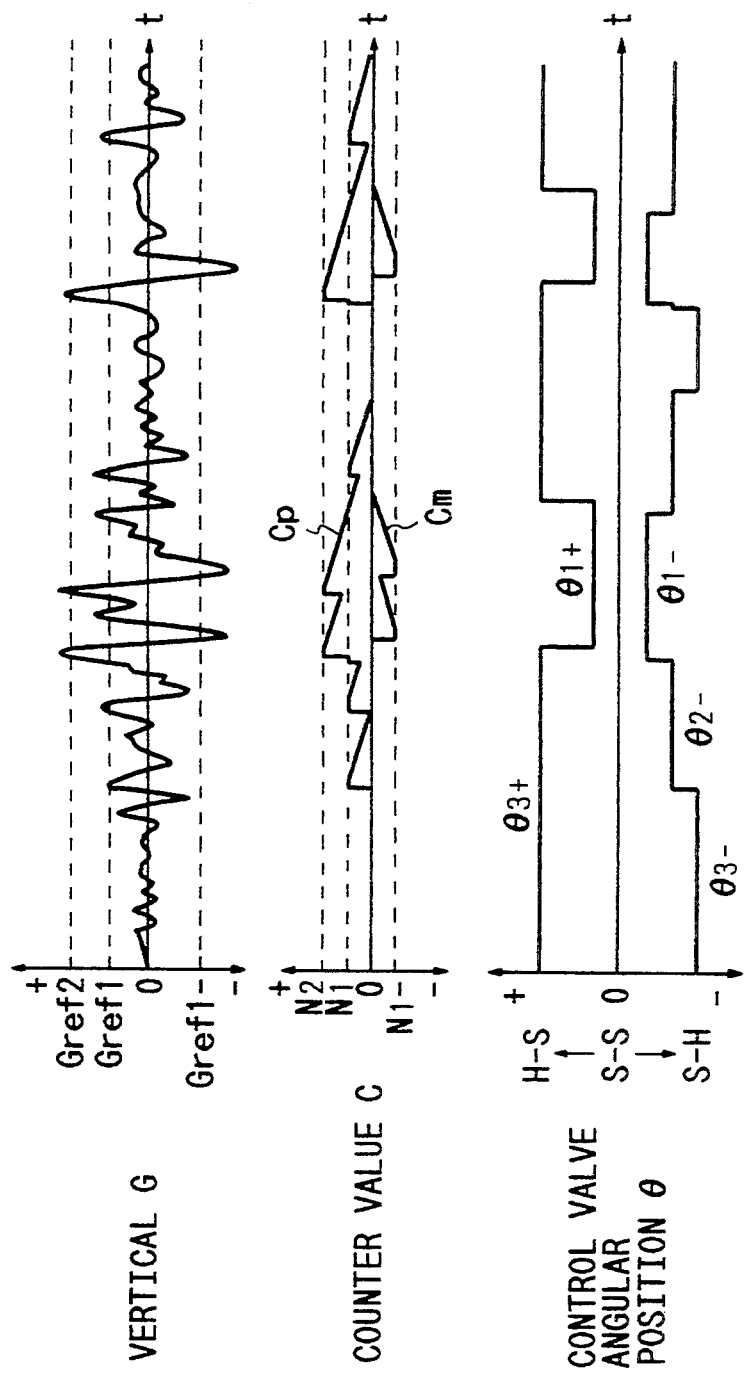
FIG. 10 a time-chart which corresponds to the flowchart in FIG. 9.

After steps 210 or 216, the routine proceeds to step 218 wherein it is determined whether the counter value $C_p$ represents a value other than zero or not. If a NO answer is obtained, the routine then proceeds to step 222 wherein it is determined whether the counter value $C_m$ represents a value other than zero or not. If a YES answer is obtained, the routine proceeds to step 224 wherein one is added to the counter value $C_m$ to update it. If a NO answer is obtained in step 222 or after step 224, the routine then proceeds to step 226 wherein an angular direction ($\theta+$, $\theta-$) of the control valve 60 is determined based on the sprung vertical speed V and the threshold value $V_{ref+}$ or $V_{ref-}$ in the relation, as shown in FIG. 6, and the amount of rotation, or angle ($\theta$) thereof is then determined based on the counter values $C_p$ or $C_m$. As can be seen in FIG. 10, the counter value $C_p$ is in a positive correlation with the angle $\theta-$, the counter value $C_m$ is also in a positive correlation with the angle $\theta+$.

According to the second embodiment, as is clear from FIG. 10, when although the vertical speed is constant, the vehicle is traveling on an uneven road surface causing a greater vertical acceleration to act on the vehicle body, the damping force characteristics of the shock absorber is adjusted to assume the smaller or softer damping force, thereby assuring good riding comfort. Additionally, even when upward vibratory energy becomes great so that the sprung vertical acceleration exceeds the threshold value $G_{ref1}$, the damping force in the compression stroke is maintained at a smaller value (i.e., the angle $\theta3+$).

Figure 11:
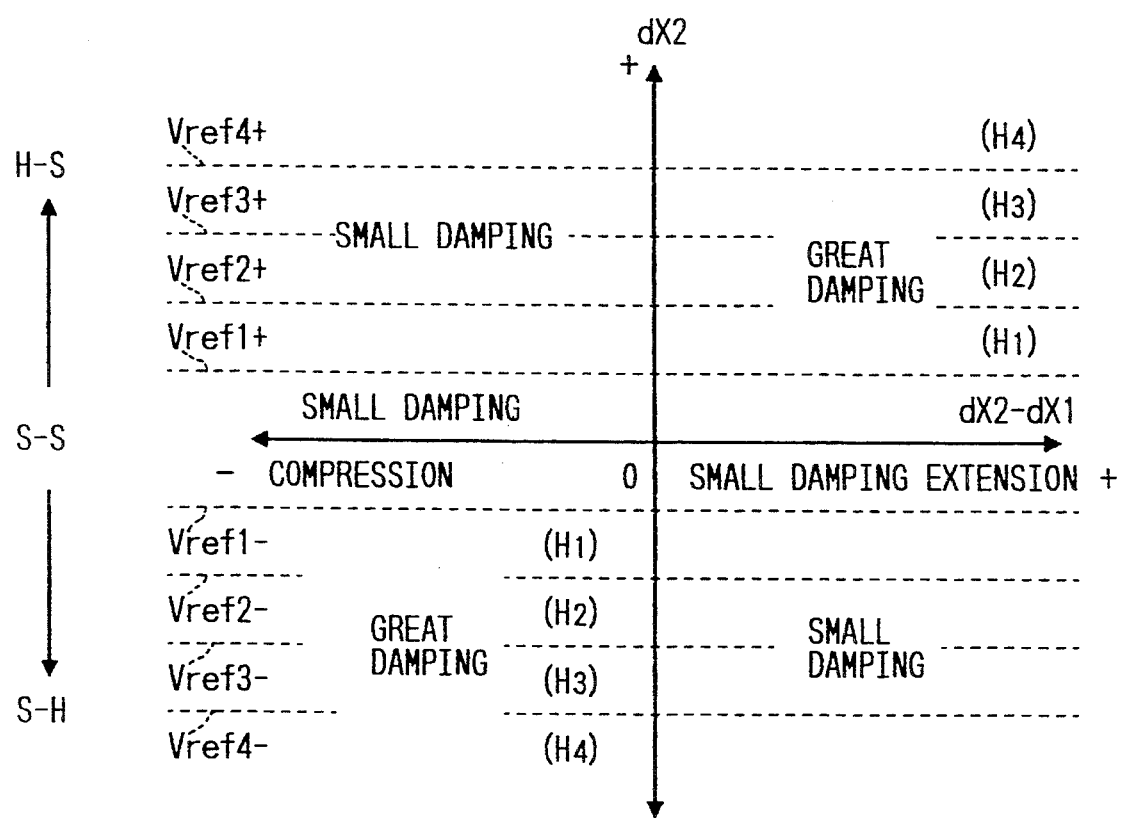
FIG. 11 is a graph which shows damping characteristics of a variable damping force shock absorber relative to vertical speed $dX2$ in compression and extension strokes.
Figure 12:
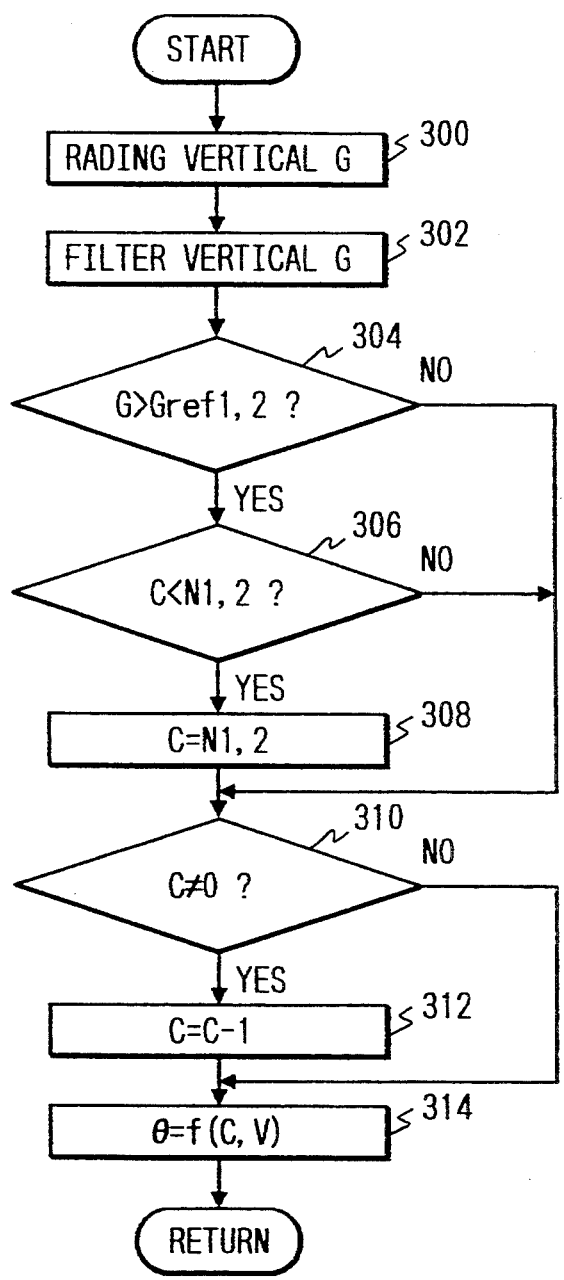
FIG. 12 is a flowchart which shows a third embodiment of a program performed by a control unit.
Figure 13:
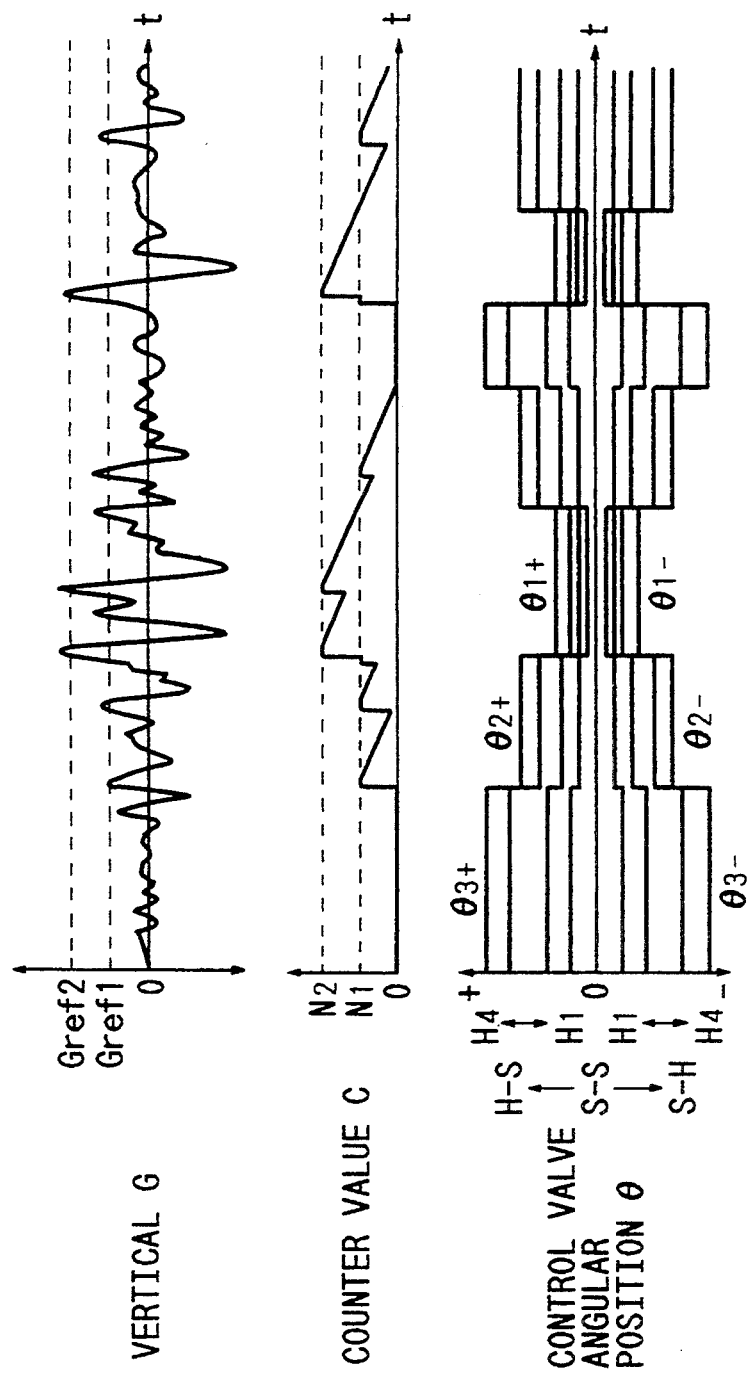
FIG. 13 a time-chart which corresponds to the flowchart in FIG. 12.

Referring to FIGS. 11, 12, and 13, a third embodiment will be described hereinafter.

In this embodiment, as shown in FIG. 11, vertical speed threshold values $V_{ref1}$, $V_{ref2}$, $V_{ref3}$, and $V_{ref4}$ are provided in both upward and downward directions so that damping characteristics in the first mode (H-S) and the second mode (S-H) are defined by a plurality of damping forces $H_1$ to $H_4$ respectively according to the vertical speed V. These damping force $H_1$ to $H_4$, as shown in FIG. 13, are also modified in three steps ($\theta3$, $\theta2$, $\theta1$) in the same manner as in the above embodiments according to the counter value C.

With the above arrangement, in step 314 of a flowchart, as shown in FIG. 12, an angular direction ($\theta+$, $\theta-$) of the control valve 60 is determined based on the sprung vertical speed V and the threshold values $V_{ref1}$ to $V_{ref4}$ and the amount of rotation, or angle ($\theta1$, $\theta2$, or $\theta3$) thereof is then determined based on the counter value C and the threshold value over which the vertical speed V has passed.

Referring to FIGS. 14 to 20, there is shown a fourth embodiment according to the present invention.

Figure 14:
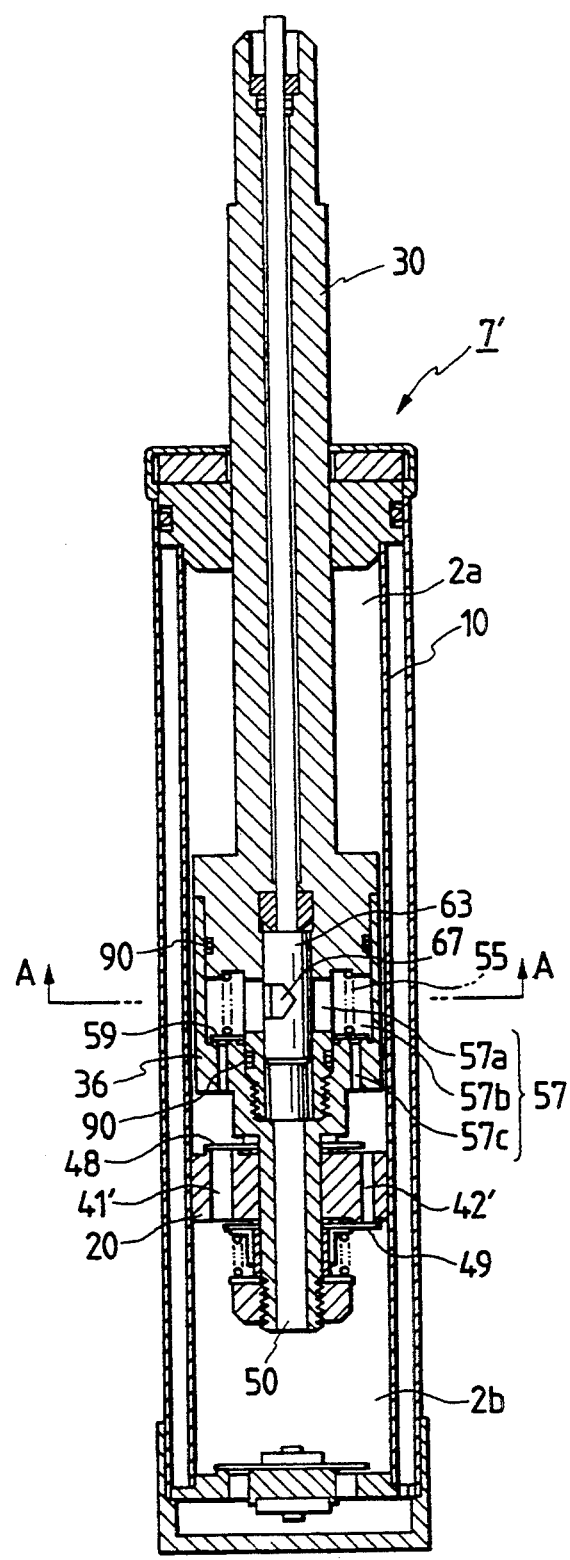
FIG. 14 is a vertical cross-sectional view which shows a second embodiment of a variable damping force shock absorber of the present invention.

FIGS. 14 to 16 shows a modification of the shock absorber as shown in FIGS. 2 to 4. The shown shock absorber 7' includes piston rods A 30 and C36. The piston rod C36 engages the piston rod A30 in a screw fashion. A spring chamber 57b is defined between the piston rods A30 and C35 in sealing engagement therewith through two O-rings 90. In the spring chamber 57b, a coil spring 55 and a plate type check valve 59 are arranged.

Communication passages 57a and 57c are defined in the piston rods A30 and C36. These passages complete an extension phase fluid passage 57 together with the spring chamber 57. The check valve 59 controls fluid communication between an upper chamber 2a and the extension phase fluid passage 57 so that fluid flow is directed only from the upper chamber 2a to a control valve 53.

A main piston 20 includes therein a main compression phase fluid passage 41' having a relatively great passage area and a main extension phase fluid passage 42' having a relatively small passage area. The main compression phase fluid passage 41' is selectively opened and closed by a plate type check valve 48 arranged on an upper surface of the main piston 20. The main extension phase fluid passage 42' is opened and closed by a plate type check valve 49 arranged on a lower surface of the main piston 20. The check valve 48 is thinner than the check valve 49. Additionally, a sub-fluid passage 50 is defined in the piston rod C36 which establishes fluid communication between the upper and lower chambers 2a and 2b.

The control valve 63 is rotatably arranged in fluid tight relationship with an inner wall of a cylindrical lower portion of the piston rod A30.

With the above arrangement, operating the actuator 6 causes the control valve 63 to rotate in its circumferential direction in the piston rod A30.

FIG. 15 shows a vertical cross-sectional structure of the control valve 63. As can be seen in the drawing, the control valve 63 includes a hollow cylindrical lower portion which forms part of the sub-fluid passage 50.

FIG. 16(a) is a horizontal cross sectional view taken along the lines A—A in FIG. 14. FIG. 16(b) is a horizontal cross sectional view taken along the line B—B in FIG. 14.

Figure 17:
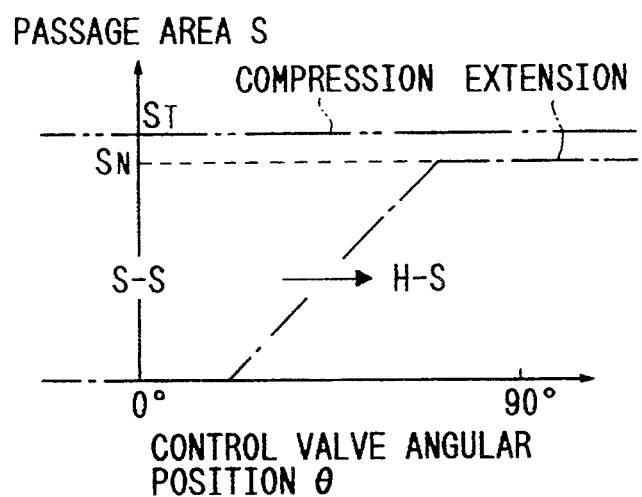
FIG. 17 is a graph which shows a relation between an angular position of a control valve in a variable damping force shock absorber of the second embodiment and a fluid passage area S of the control valve.

As is clear from the drawings, the control valve 63 includes a pair of polygonal extension phase openings 67 which serves to selectively establish or block fluid communication between the sub-fluid passage 50 and the extension phase fluid passage 57 according to the rotation of the control valve 63. The extension phase openings 67 are so arranged as to coincide with the communication passage 57a. As shown in FIG. 17, according to an angular position $\theta$ of the control valve 63, a communication passage area S is varied. Here, $S_N$ shows a maximum communication passage area between the extension phase openings 67 and the communication passage 57a, which determines a minimum damping coefficient, or force during an extension stroke. $S_T$ represents a communication passage area during a compression stroke which serves to provide a damping force of a constant value. The relation between the communication passage areas $S_N$ and $S_T$ may be optionally selected. For example, it is preferable that the communication area S be varied either linearly or variably relative to the angular position $\theta$ of the control valve 63.

With the above arrangement, when the control valve 63 is in a position as shown in FIGS. 16(a), it will cause the fluid communications to be established between the extension phase fluid passage 57 and the sub-fluid passage 50. Therefore, when the working fluid flows from the upper chamber 2a to the lower chamber 2b, it passes substantially through the sub-fluid passage 50 having the relatively great passage area. Alternatively, when the working fluid flow is directed from the lower chamber 2b to the upper chamber 2a, the working fluid passes substantially through the compression phase fluid passage 41' having the relatively great passage area. This produces a smaller damping force during both compression and extension strokes.

Additionally, rotation of the control valve 63 at approximately ninety degrees (90°) from the position, as shown in FIGS. 16(a), to the position, as shown in FIG. 16(b), causes the fluid communication between the extension phase fluid passage 57 and the sub-fluid passage 50 to be blocked. Thus, when the working fluid flows from the upper chamber 2a to the lower chamber 2b, it passes substantially through the main extension phase fluid passage 42' having the relatively smaller passage area. Alternatively, when the working fluid flow is directed from the lower chamber 2b to the upper chamber 2a, the working fluid passes substantially through the main compression phase fluid passage 41' having the relatively great passage area. This produces a greater damping force during the extension stroke, while a smaller damping force is created during the compression stroke.

As discussed above, by operating the actuator 6 to modify the angular position ($\theta$) of the control valve 68, the communication passage areas between the sub-fluid passage 50 and the extension phase fluid passage 57 is varied, thereby modifying damping characteristics in the extension stroke while maintaining damping characteristics in the compression stroke at a smaller damping force.

Hereinafter, an operation of the variable damping force shock absorber 7' controlled by the control unit 5 will be described in detail. In the following discussion, it is assumed that parameters such as displacement, speed, and acceleration of a vehicle body and a wheel assume positive (+) in an upward direction.

Under control of this embodiment, the shock absorber 7', when serving to dampen vibratory motion of the vehicle body in an extension stroke, produces the greater damping force, while it produces the smaller damping force when allowing the vibratory motion of the vehicle body to be excited in the extension stroke. Additionally, during a compression stroke of the shock absorber 7', the damping force characteristics are maintained to assume a smaller damping force for reducing the transmission of vibrations to the vehicle body caused by fine irregularities on a road surface.

Figure 18:
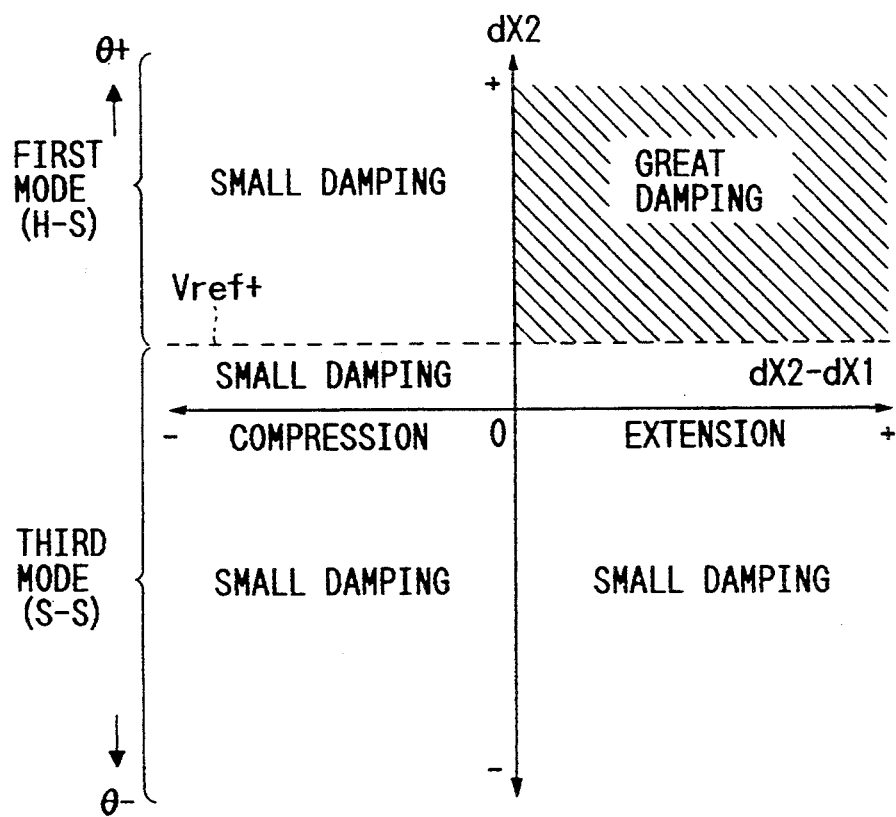
FIG. 18 is a graph which shows damping characteristics of a variable damping force shock absorber of the second embodiment relative to vertical speed $dX2$ during compression and extension strokes.

Additionally, the relations of the damping force with the vertical speed V (=$d \times 2$) and the relative speed $d \times 2$-$d \times 1$ between sprung and unsprung portions are defined, as shown in FIG. 18. As different from the one shown in FIG. 6, only one threshold value $V_{ref+}$ is provided for the vertical speed V in a positive direction (i.e., an upward direction). The first mode (H-S) is established when an angular position of the control valve 63 falls in a range of $\theta+$, while the third mode (S-S) is established when the angular position of the control valve 63 assumes substantially zero.

Figure 19:
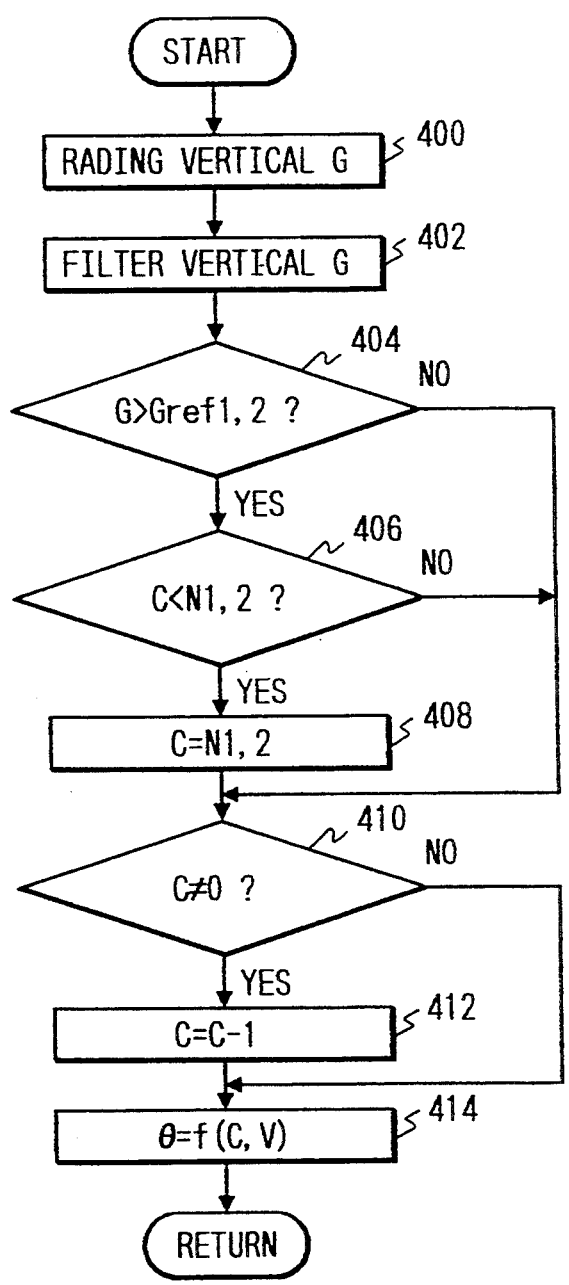
FIG. 19 is a flowchart which shows a fourth embodiment of a program or logical steps performed by a control unit for a variable damping force shock absorber, as shown in FIG. 14.

FIG. 19 shows a flowchart of a program of the fourth embodiment performed by the control unit 5. This program is essentially similar to the one shown in FIG. 7 in the first embodiment and explanation thereof in detail will be omitted here.

Figure 20:
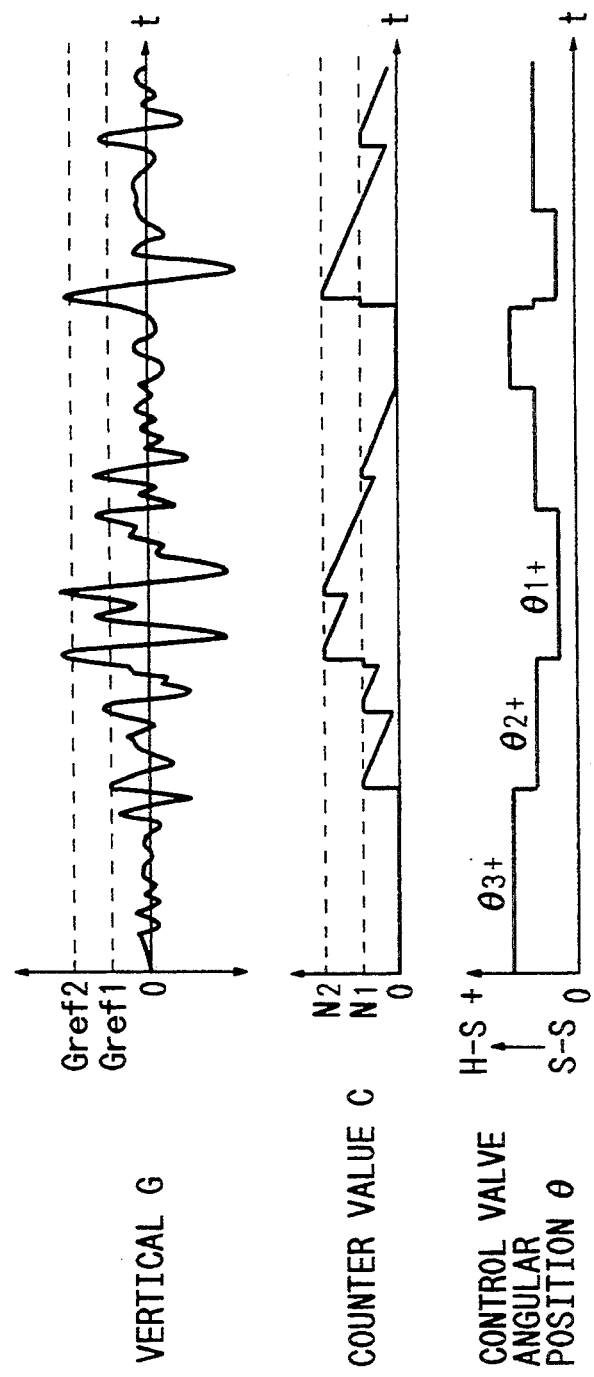
FIG. 20 is a time-chart which corresponds to the flowchart in FIG. 19.

Accordingly, as shown in a time-chart of FIG. 20, the angular position $\theta$ of the control valve 63 is modified only in the positive direction ($\theta+$) so that damping force characteristics in the first mode (H-S) are controlled according to the counter value C.

Figure 21:
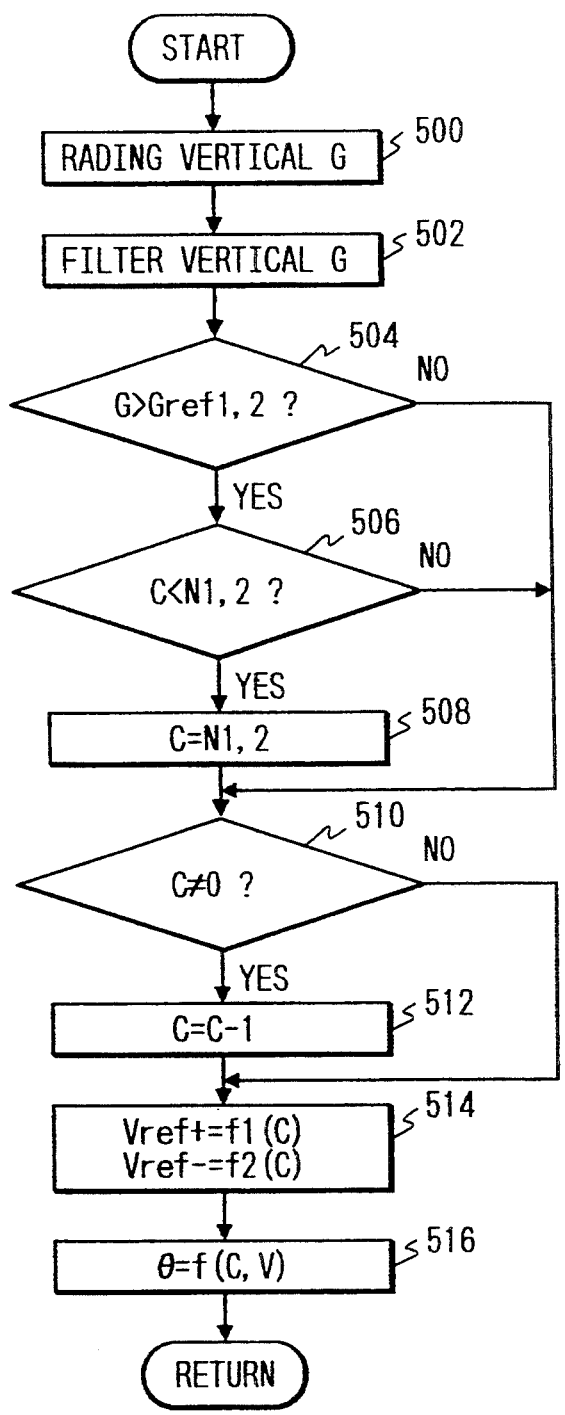
FIG. 21 is a flowchart which shows a fifth embodiment of a program performed by a control unit.
Figure 22:
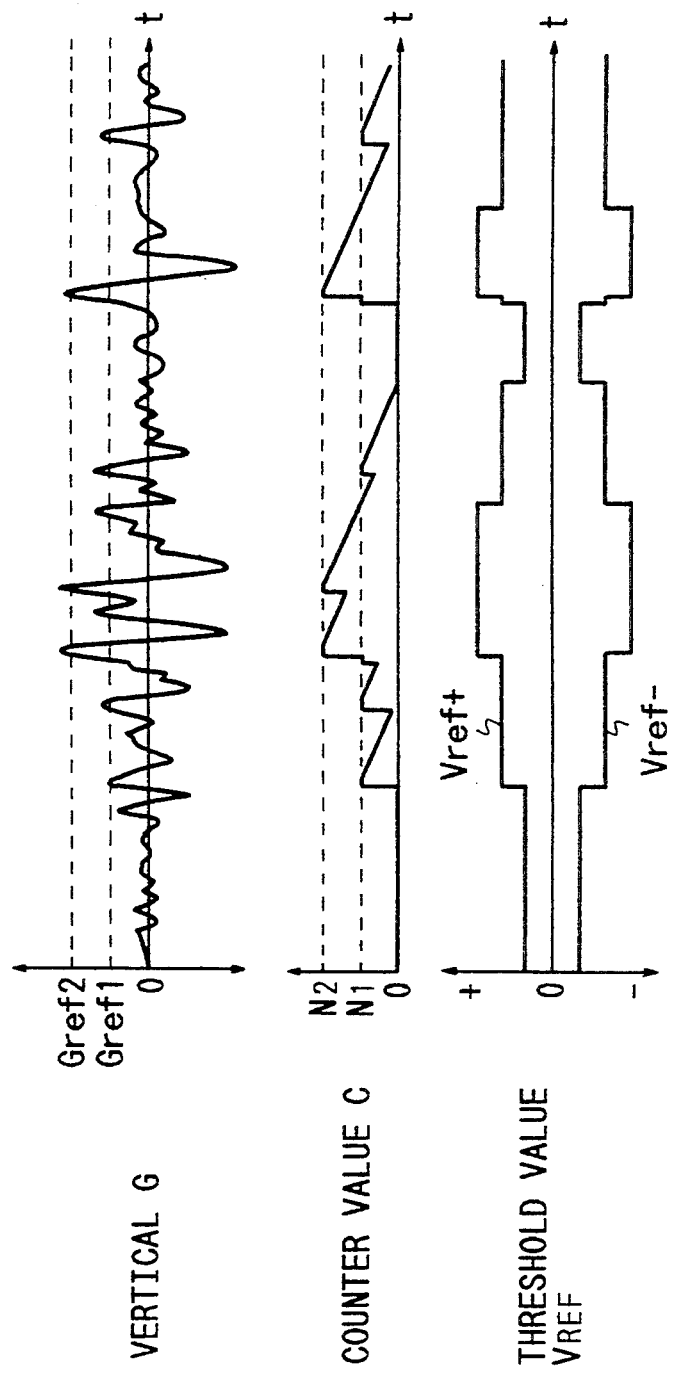
FIG. 22 a time-chart which corresponds to the flowchart in FIG. 21

Referring to FIGS. 21 and 22, there is shown a fifth embodiment according to the present invention. This embodiment utilizes the shock absorber, as shown in FIG. 2.

In the flowchart, as shown in FIG. 21, the sprung vertical acceleration or its high-frequency components are compared with the acceleration threshold values $G_{ref1}$ and $G_{ref2}$. In step 514, the vertical speed threshold values $V_{ref+}$ and $V_{ref-}$ are, as shown in a time-chart of FIG. 22, defined according to the counter value C. In step 516, an angular direction ($\theta+$, $\theta-$) of the control valve 60 is, as shown in FIG. 6, determined based on the sprung vertical speed V and the threshold values $V_{ref+}$ or $V_{ref-}$ corrected in step 514, and the amount of rotation, or angular position ($\theta1$, $\theta2$, or $\theta3$) thereof is then determined based on the counter value C.

It will be noted that, as can be seen in FIG. 22, the vertical speed threshold values $V_{ref+}$ is in a positive correlation with the vertical acceleration G and the counter value C, while the vertical speed threshold value $V_{ref-}$ is in a negative correlation with the vertical acceleration G and the counter value C. Additionally, a range where the third mode (S-S) is established is changed dependent upon the magnitude of the vertical acceleration G, or the counter value C. Other arrangements land operation of the system are essentially the same as the first embodiment.

Figure 23:
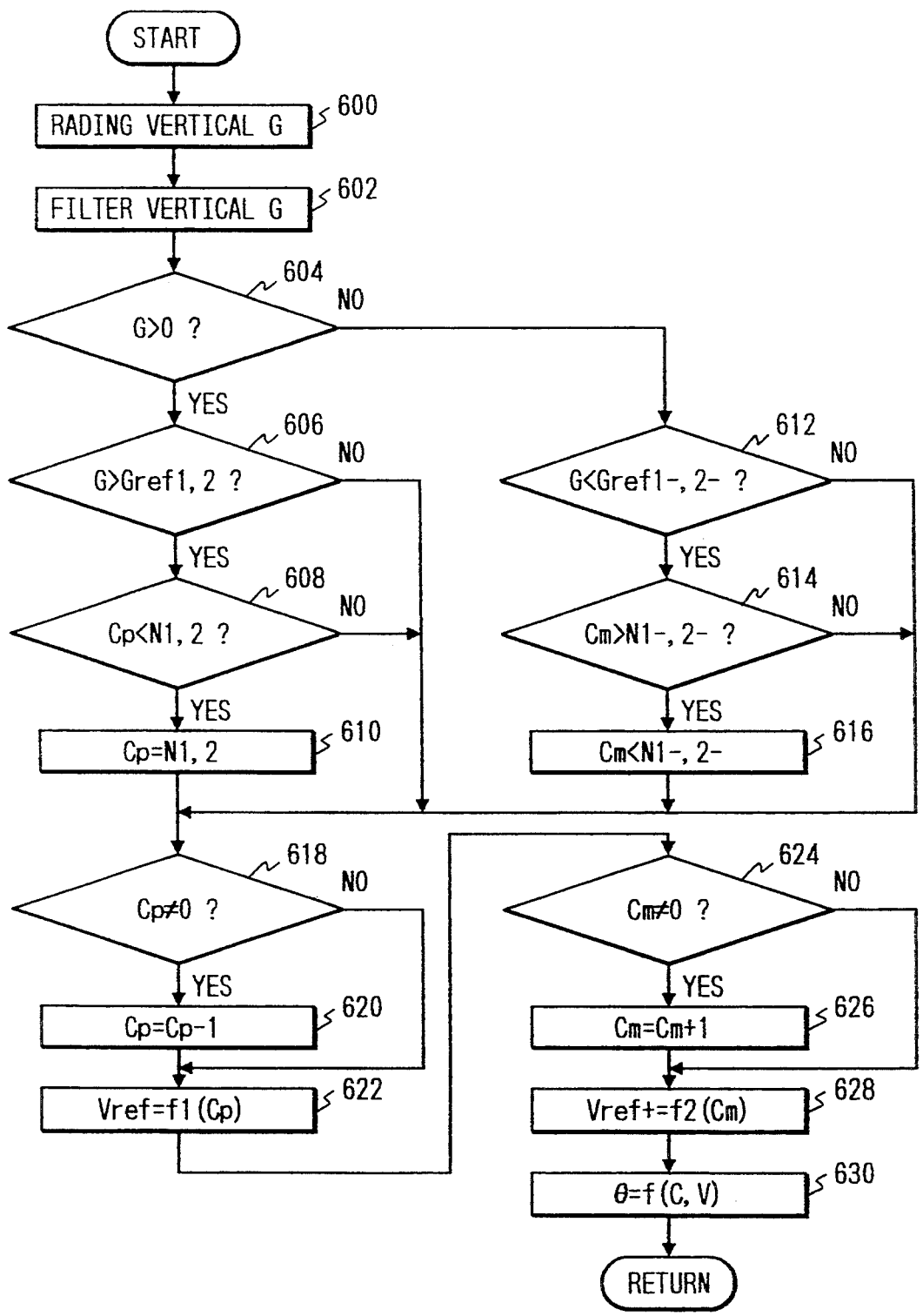
FIG. 23 is a flowchart which shows a sixth embodiment of a program performed by a control unit.
Figure 24:
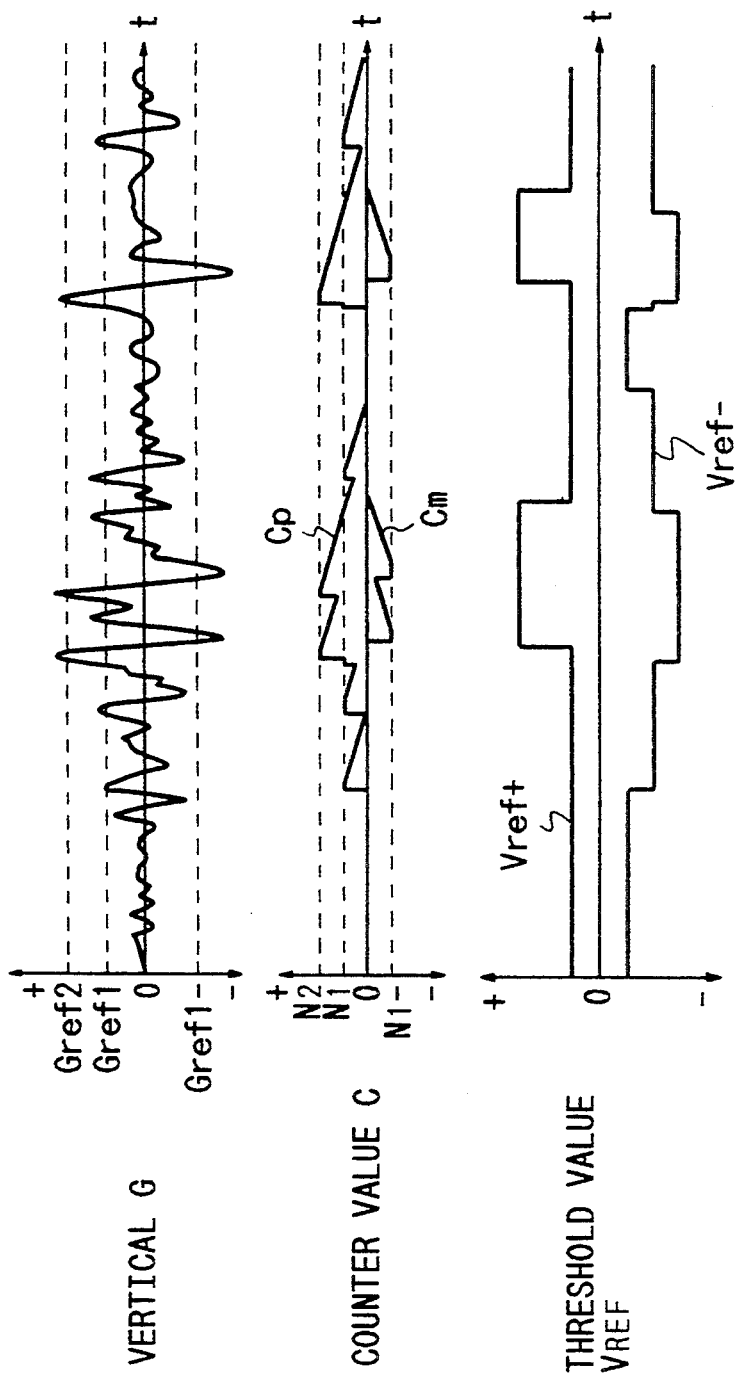
FIG. 24 a time-chart which corresponds to the flowchart in FIG. 23.

Referring to FIGS. 23 and 24, there is shown a sixth embodiment according to the present invention. This embodiment utilizes the shock absorber, as shown in FIG. 2.

A flowchart in FIG. 23 is substantially similar to the one as shown in FIG. 9 in the second embodiment, however, different therefrom in steps 622, 628, and 630.

In step 622, a negative vertical speed threshold value $V_{ref-}$ is determined in a preselected relation to the counter value $C_p$, as shown in FIG. 24. Additionally, in step 628, a positive vertical speed threshold value $V_{ref+}$ is determined in a preselected relation to the counter value $C_m$. In step 630, an angular direction $(\theta+, \theta-)$ of the control valve 60 is, as shown in FIG. 6, determined based on the sprung vertical speed V and the threshold values $V_{ref+}$ or $V_{ref-}$ corrected in steps 622 or 628, and the amount of rotation, or angular position ($\theta$1, $\theta$2, or $\theta$3) thereof is then determined based on the counter value C.

As can be seen in FIG. 24, the vertical speed threshold values $V_{ref+}$ is in a negative correlation with the vertical acceleration G and the counter value $C_m$, while the vertical speed threshold value $V_{ref-}$ is in a negative correlation with the vertical acceleration G and the counter value $C_p$.

In this embodiment, as long as the vertical acceleration G is lower than the threshold value $G_{ref1}$, the vertical speed threshold value $V_{ref+}$ is maintained at a smaller value.

Figure 25:
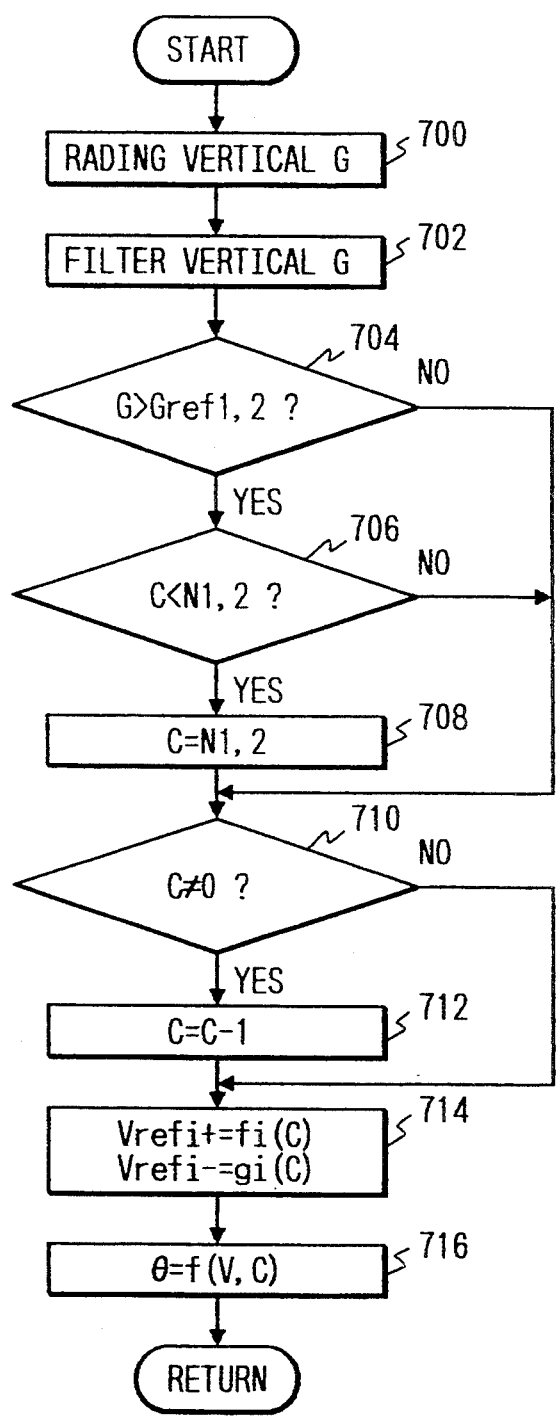
FIG. 25 is a flowchart which shows a seventh embodiment of a program performed by a control unit.
Figure 26:
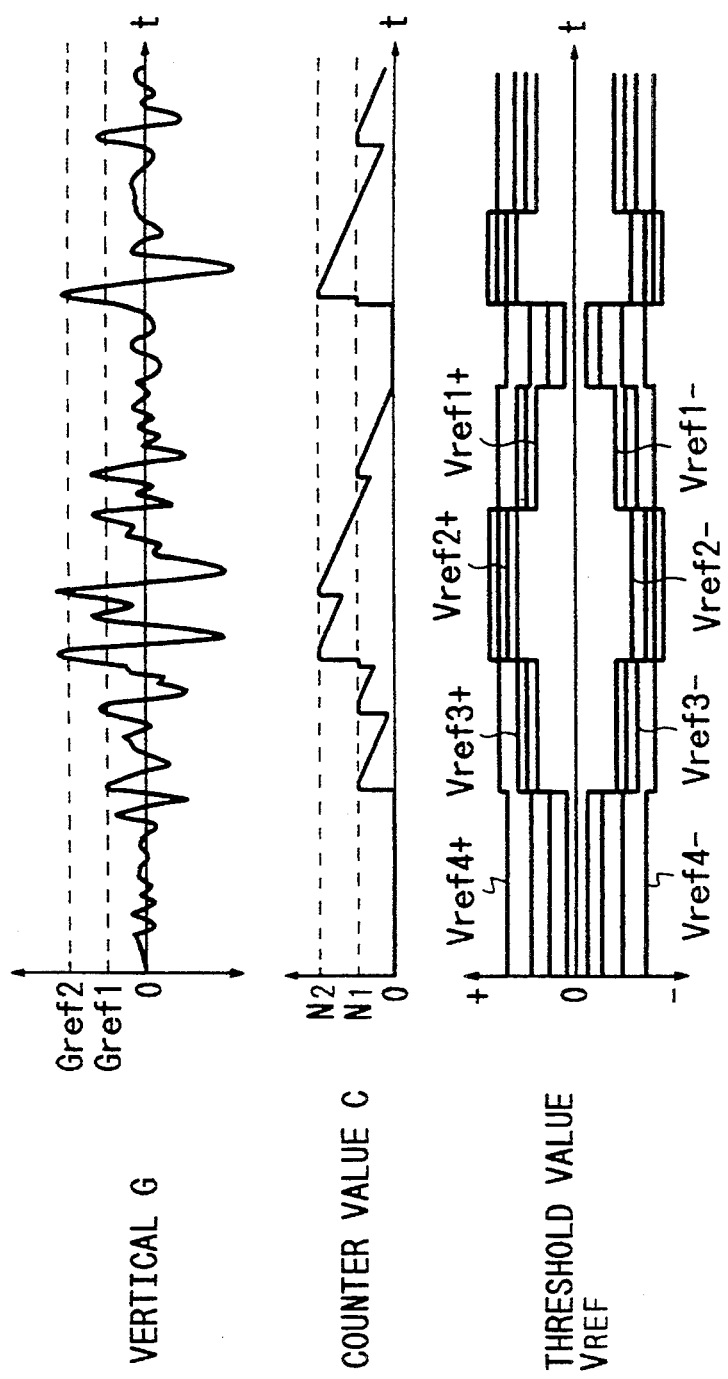
FIG. 26 a time-chart which corresponds to the flowchart in FIG. 25.

Referring to FIGS. 25 and 26, there is shown a seventh embodiment of the invention. This embodiment includes a combination of the third and fifth embodiments wherein the first mode (H-S) and the second mode (S-H), as shown in FIG. 11, include a plurality of damping characteristics H1 to H4 defined by the vertical speed threshold values $V_{refi+}$ and $V_{refi-}$ respectively which are varied according to the counter value C.

In a flowchart, as shown in FIG. 25, in step 714, the vertical speed threshold values $V_{refi+}$ and $V_{refi-}$ are, as shown in a time-chart of FIG. 26, determined in preselected relations (fi(C), gi(C)) to the counter value C (=Ni). The threshold value $V_{refi+}$ is in a positive correlation with the counter value C, while the threshold value $V_{refi-}$ is in a negative correlation with the counter value C.

In step 716, an angular direction $(\theta+, \theta-)$ of the control valve 60 is determined based on the sprung vertical speed V and the threshold values $V_{ref1}$ to $V_{ref4}$ derived in step 714, and the amount of rotation, or angle ($\theta$1, $\theta$2, or $\theta$3) thereof is then determined based on the counter value C and the threshold value over which the vertical speed V has passed in the same manner as in step 314 in FIG. 12.

Figure 27:
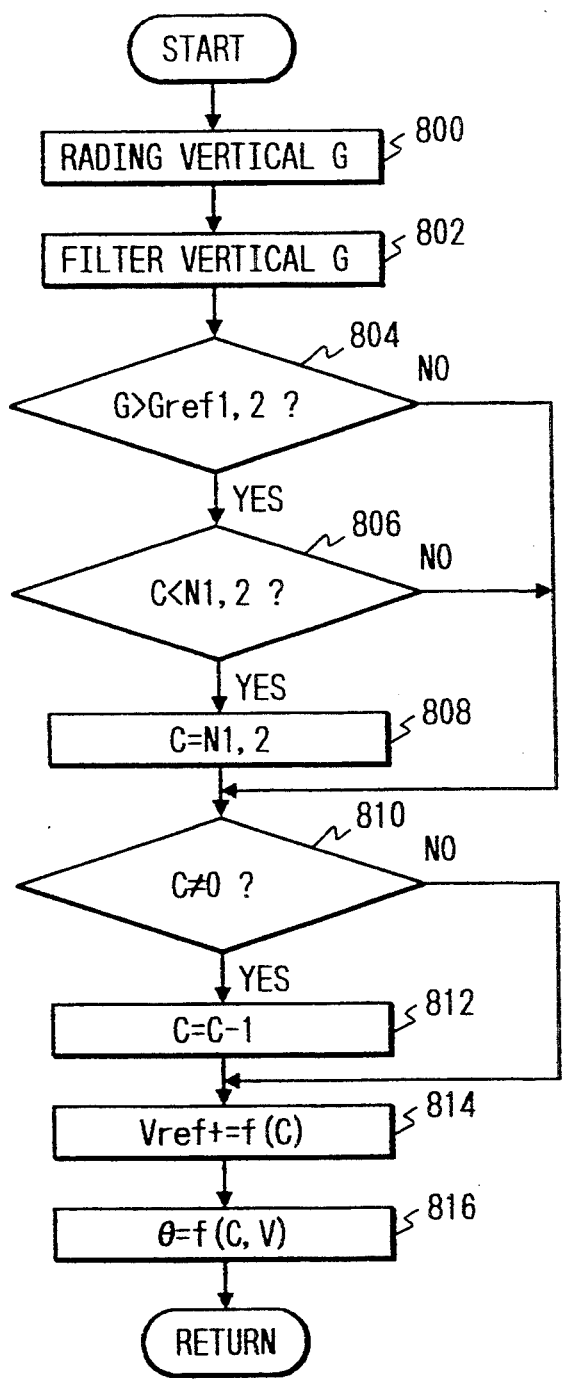
FIG. 27 is a flowchart which shows an eighth embodiment of a program performed by a control unit.
Figure 28:
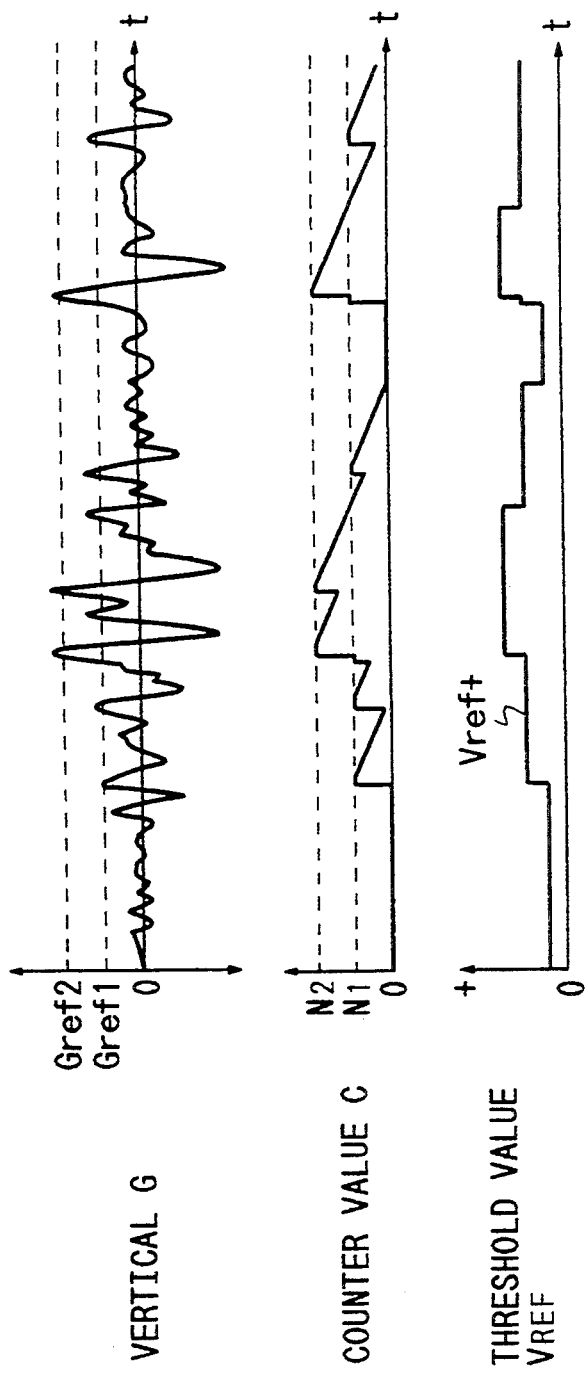
FIG. 28 a time-chart which corresponds to the flowchart in FIG. 27

Referring to FIGS. 27 and 28, there is shown an eighth embodiment of the invention. This embodiment utilizes the shock absorber in the fourth embodiment, as shown in FIG. 14, and similar to the fifth embodiment, as shown in FIG. 22, varies the vertical speed threshold value $V_{ref+}$ in a preselected relation to the counter value C in step 814. Therefore, according to this embodiment, an angular position of the control valve 63 is determined by look-up using the map, as shown in FIG. 18, so that the mode selection timing between the first mode (H-S) and the third mode (S-S) is varied based on a function of the vertical acceleration G.

Figure 29:
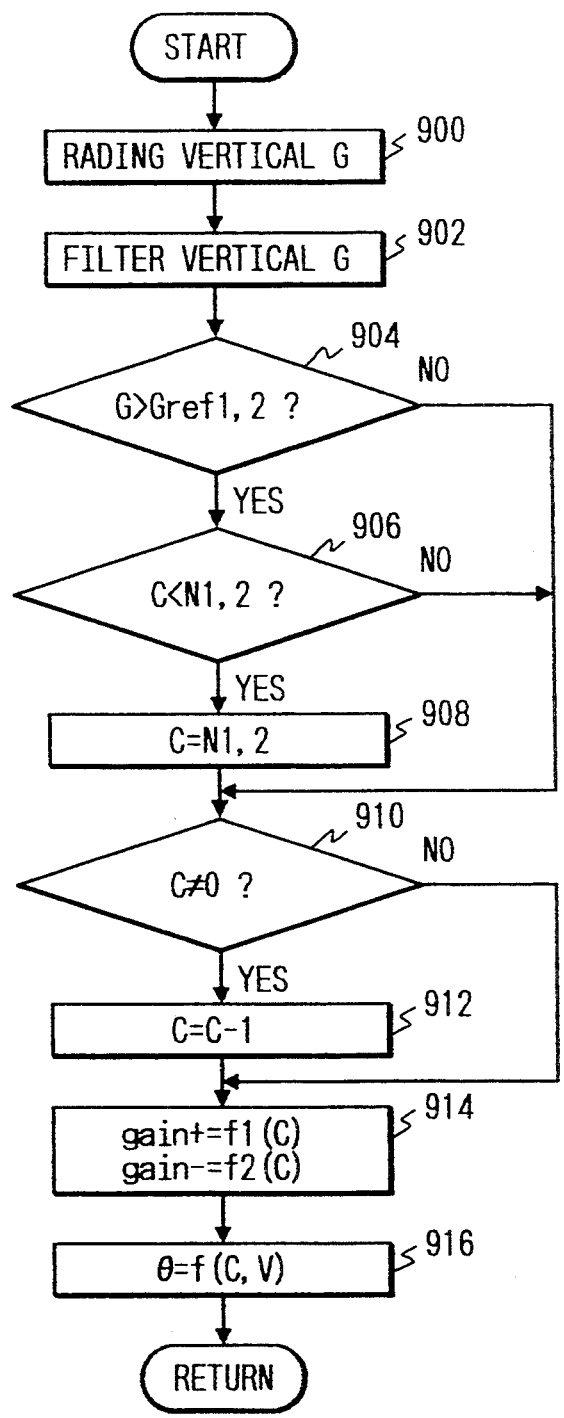
FIG. 29 is a flowchart which shows a ninth embodiment of a program performed by a control unit.
Figure 30:
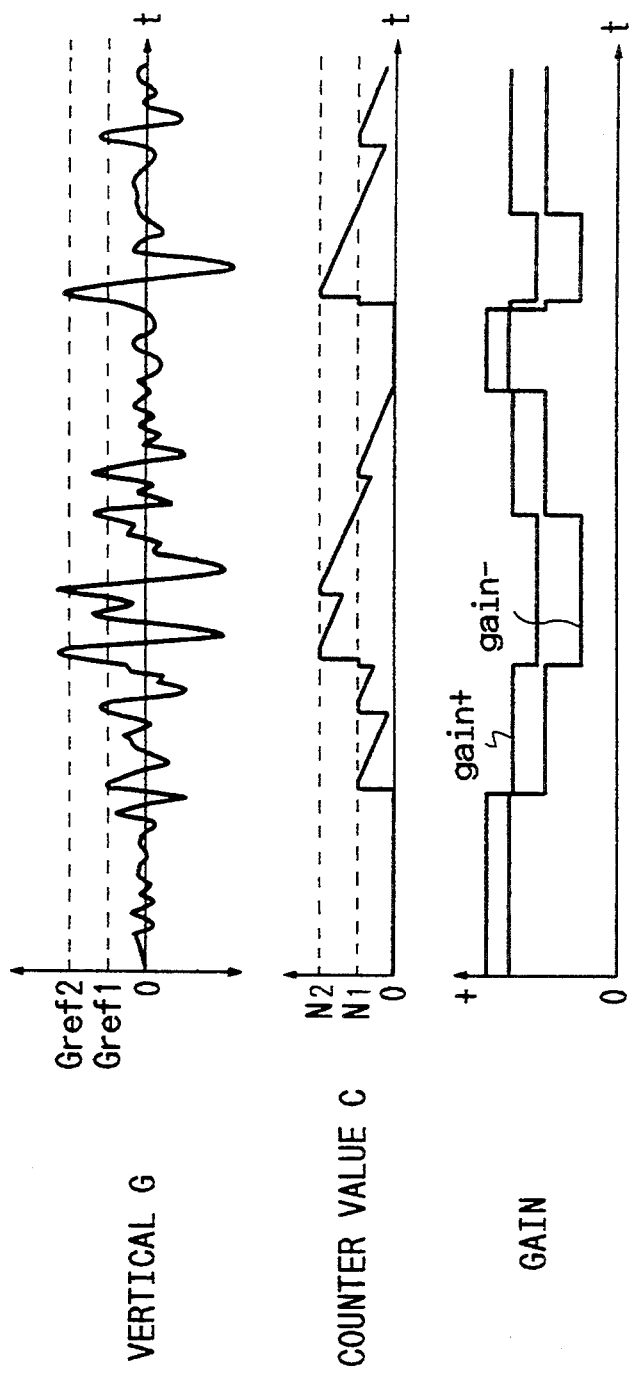
FIG. 30 a time-chart which corresponds to the flowchart in FIG. 29.

Referring to FIGS. 29 and 30, there is shown a ninth embodiment according to the invention. This embodiment utilizes the shock absorber in the first embodiment, as shown in FIG. 2, and is directed to an arrangement wherein the sprung vertical speed V is corrected for shifting a timing of the damping characteristic mode selection according to the following relation.

*(corrected vertical speed) = gain × (actual vertical speed)*

The gain is provided with a positive value (gain+) when the actual vertical speed is in an upward direction or a negative value (gain−) when the actual vertical speed is in a downward direction. The gain+ may be made equal to the gain− (gain+ = gain−).

A flowchart, as shown in FIG. 29, substantially corresponds to the one in FIG. 7 except step 914. In step 914, the gain+ and the gain− are, as shown in a time-chart of FIG. 30, determined in preselected relations (f1(C), f2(C)) to the counter value C given based on the sprung vertical acceleration G. As can be seen in the time-chart, the gain+ and the gain− are in negative correlations with the counter value C (i.e., the vertical acceleration G) respectively. The gain+ may alternatively be set to a constant value. Additionally more than three gains may be provided. In step 916, an angular direction $(\theta+, \theta-)$ of the control valve 63 is determined by look-up using the map, as shown in FIG. 6 and an angular position $\theta$ thereof is then determined based on the counter value C. Accordingly, this embodiment is such that the damping characteristic mode selection timing among the first mode (H-S), the second mode (S-H), and the third mode (S-S) is varied based on a function of the counter value C (i.e., the vertical acceleration G).

Figure 31:
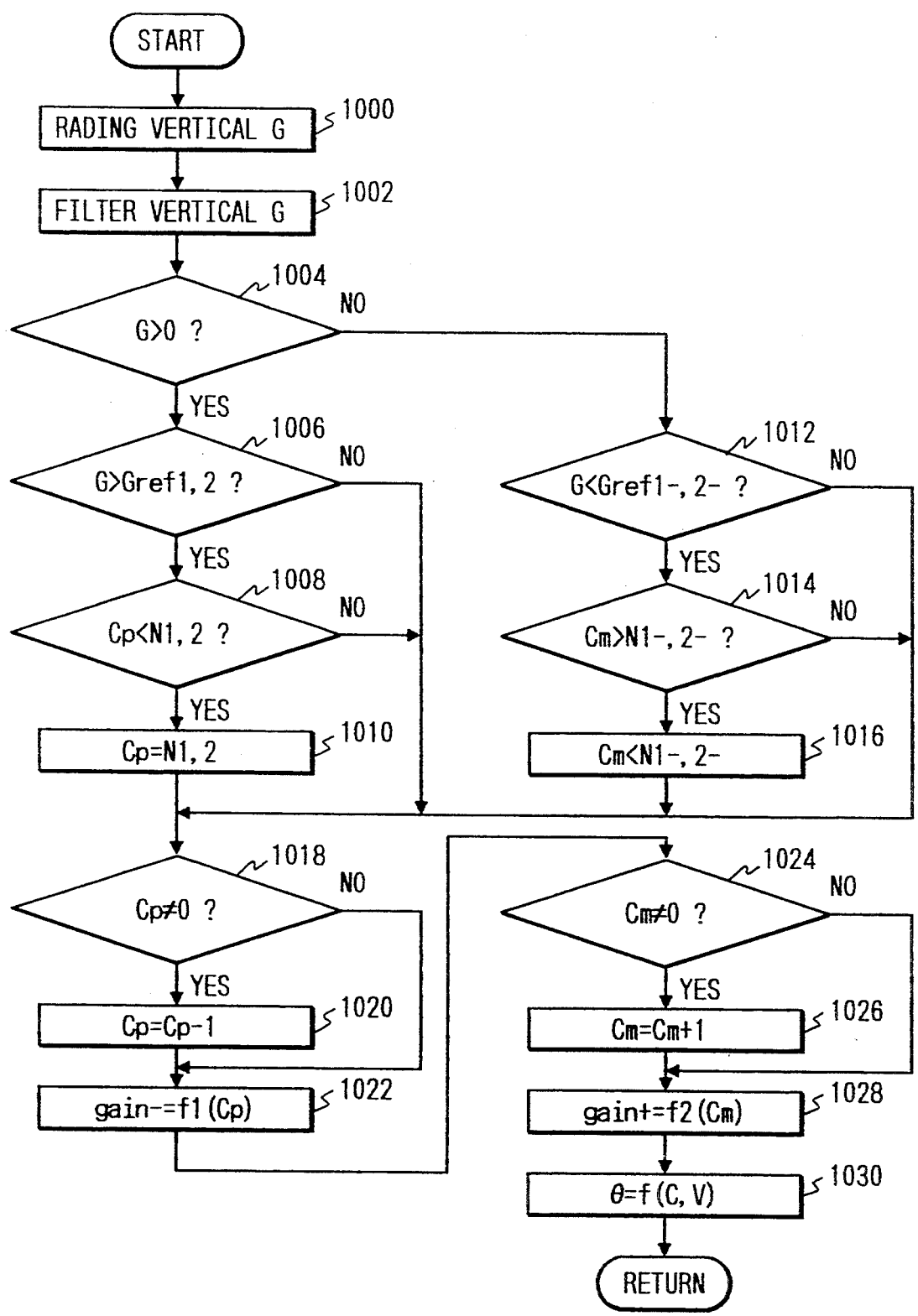
FIG. 31 is a flowchart which shows a tenth embodiment of a program performed by a control unit.
Figure 32:
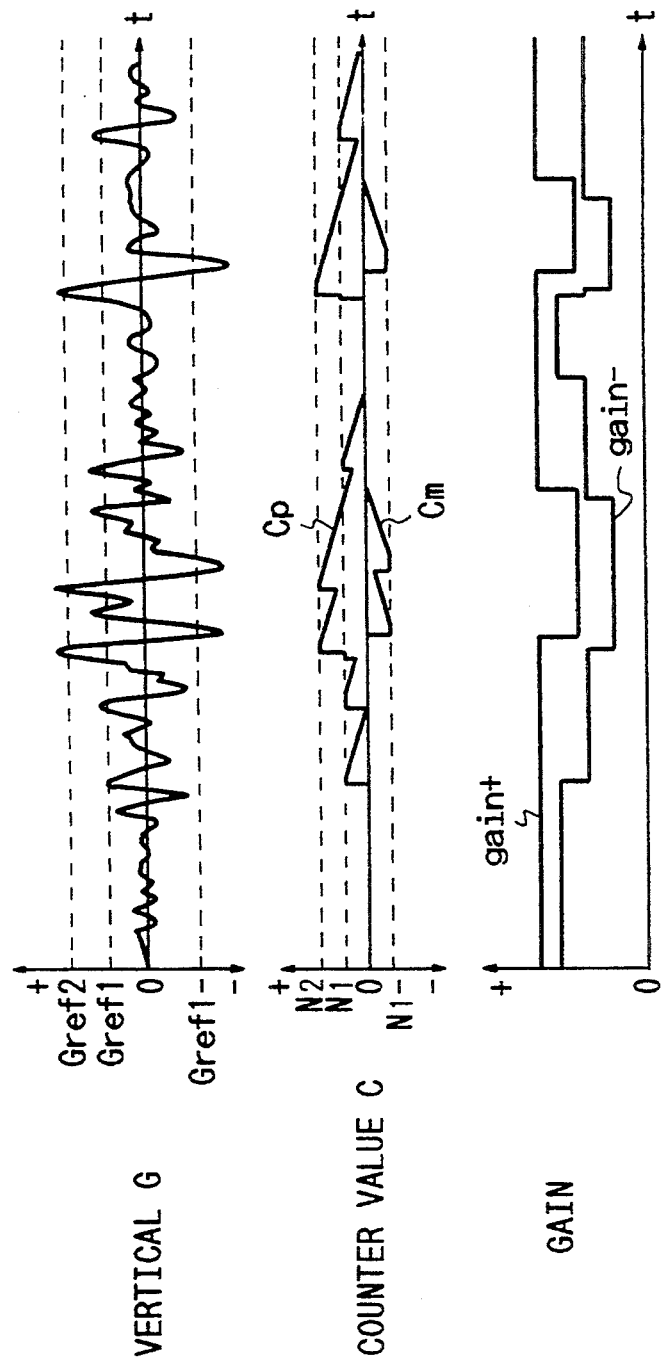
FIG. 32 is a time-chart which corresponds to the flowchart in FIG. 31.

Referring to FIGS. 31 and 32, there is shown a tenth embodiment according to the present invention. This embodiment includes a combination of the second embodiment utilizing the shock absorber 7, as shown in FIG. 2 and the ninth embodiment, as shown in FIGS. 29 and 30.

In step 1022 of a flowchart, as shown in FIG. 31, a negative correction value (gain−) is determined in a preselected relation (f1($C_p$)) to the counter value $C_p$, as shown in FIG. 32. Additionally, in step 1028, a positive correction value (gain+) is determined in a preselected relation (f2($C_m$)) to the counter value $C_m$. In step 1030, an angular direction $(\theta+, \theta-)$ of the control valve 60 is determined by look-up using the map, as shown in FIG. 6 based on the vertical speed corrected by the gain+ or the gain −, and an angular position $\theta$ thereof is determined based on the counter value C. The vertical acceleration G in the negative direction, that is, the counter value $C_m$ is in a positive correlation with the gain+, while the vertical acceleration G in the positive direction, that is, the counter value $C_p$ is in a negative correlation with the gain−. It will be noted that as is clear from FIGS. 30 and 32, this embodiment is different from the above ninth embodiment in that as long as the counter value $C_p$ is below the value N1, the gain+ is maintained at a constant value.

Figure 33:
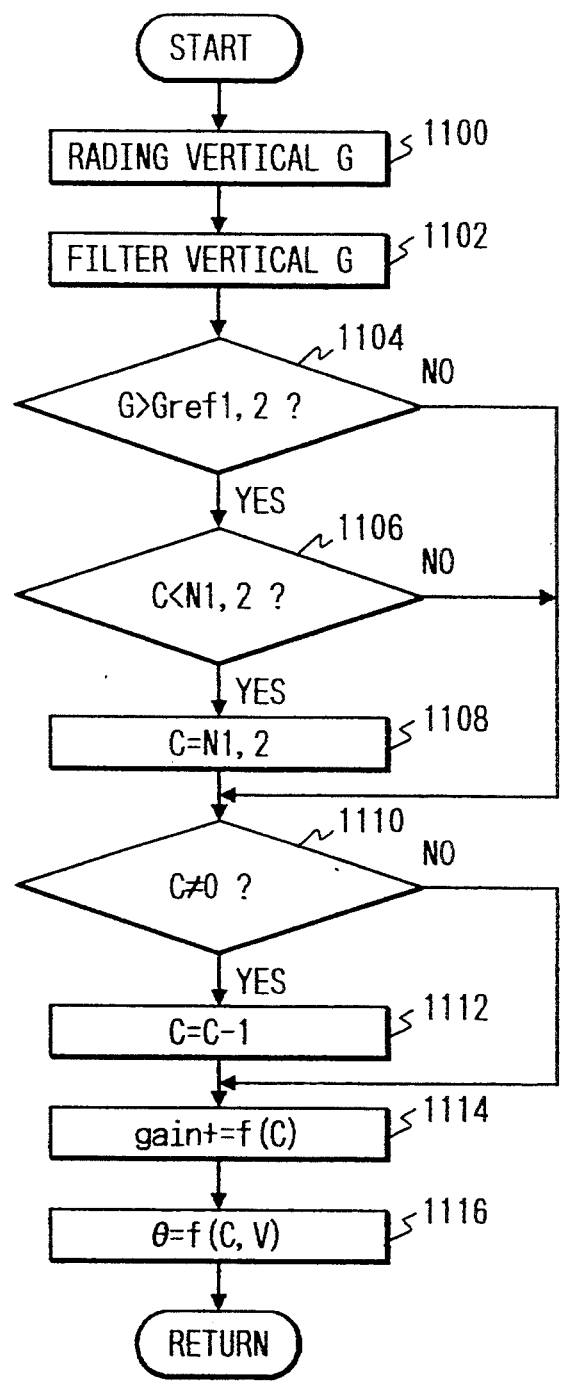
FIG. 33 is a flowchart which shows an eleventh embodiment of a program performed by a control unit.
Figure 34:
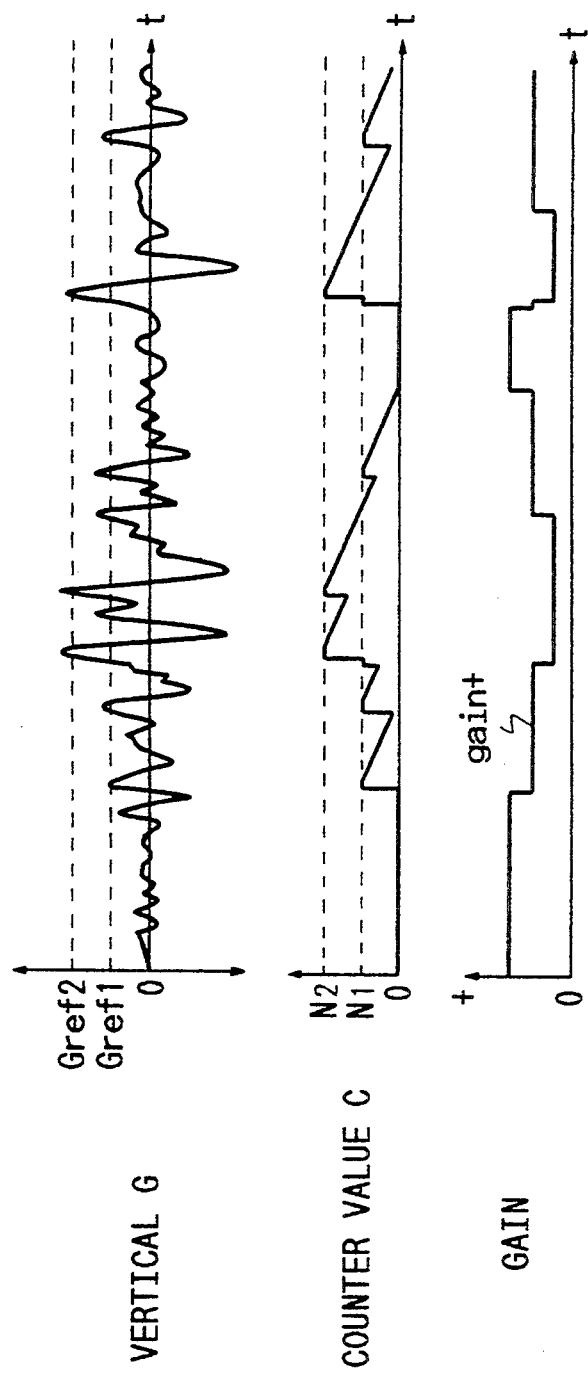
FIG. 34 is time-chart which corresponds to the flowchart in FIG. 33.

Referring to FIGS. 33 and 34, an eleventh embodiment is shown which utilizes the shock absorber 7' in the fourth embodiment, as shown in FIG. 14. This embodiment is such that the damping characteristic mode selection is made between the first mode (H-S) and the third mode (S-S) so that only the damping characteristics in the extension stroke is changed when the vertical speed V is greater than the threshold value $V_{ref+}$ which is corrected by the gain+. In step 1114 of a flowchart, as shown in FIG. 33, the gain+ is determined in a negative correlation with the counter value C, as shown in a time-chart of FIG. 34. In step 1116, an angular direction $(\theta+, \theta-)$ of the control valve 63 is determined by look-up using the map, as shown in FIG. 18, and an angular position $\theta$ thereof is determined based on the counter value C to modify the damping characteristics of the shock absorber 7'.

Figure 35:
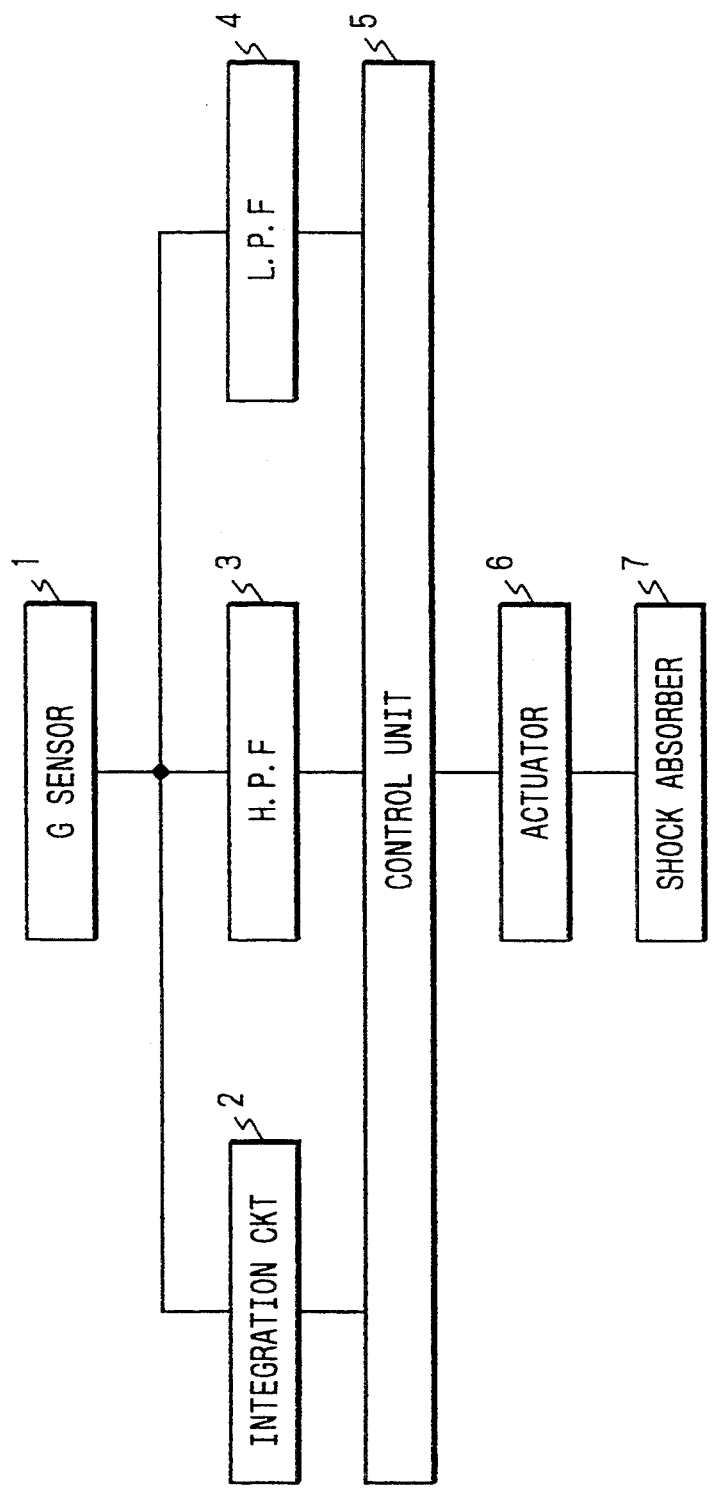
FIG. 35 is a block diagram which shows a modification of a variable damping force shock absorber control system according to the present invention.

Referring to FIGS. 35, there is shown a twelfth embodiment which represents a modification of the shock absorber control system. This shock absorber control system serves to modify the vertical speed threshold values $V_{ref+}$ and $V_{ref-}$ based on a parameter such as vibration frequencies of the sprung portion (i.e., the vehicle body 11), and includes a high-pass fileter (H. P. F.) 3 and a low-pass filter (L. P. F.) 4 in addition to the arrangements in the previous embodiments. The shock absorber 7 is the same as in the first embodiment, as shown in FIG. 2.

Upon vertical acceleration acting on the sprung portion of the vehicle body being monitored by the acceleration sensor 1, it is input to the high-pass filter 3 and the low-pass filter 4. The high-pass filter 3 then passes high-frequency components of the input vertical acceleration, while the low-pass filter 4 passes low-frequency components only.

Figure 36:
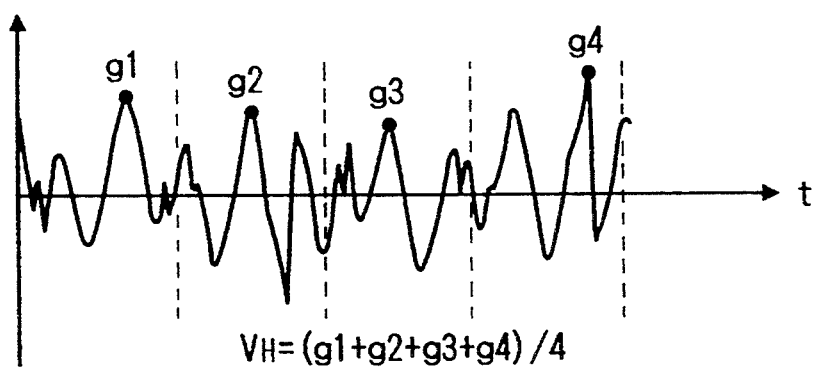
FIG. 36 is a graph which shows a way wherein a high-frequency vibration level is projected using high-frequency components of vertical acceleration acting on a vehicle body derived by a high-pass filter.

The control unit 5 is, as shown in FIG. 36, responsive to the high-frequency components passed through the high-pass filter 3 to sample a plurality of frequency peaks, for example, four peaks g1, g2, g3, and g4 each developed in a preselected period of time and averages them to provide a high-frequency vibration level $V_H$.

Figure 37:
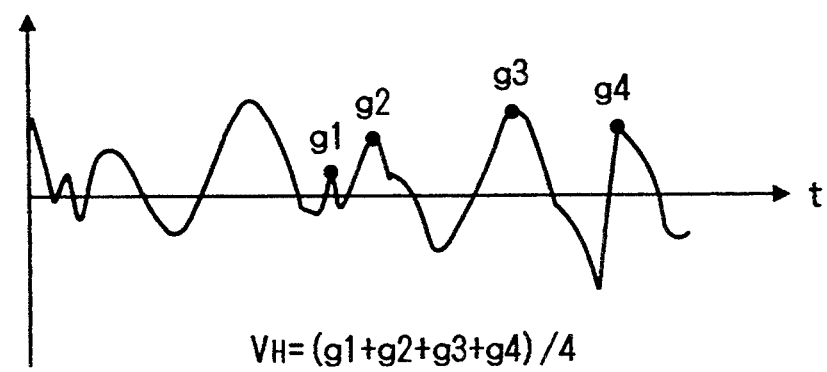
FIG. 37 is a graph which shows another way of determining a high-frequency vibration level.

FIG. 37 shows another way of determining the high-frequency vibration level $V_H$ wherein four peaks g1', g2', g3', and g4' in each amplitude of the high-frequency vibration are averaged to determine the high-frequency vibration level $V_H$.

A low-frequency vibration level $V_L$ is determined in the same manner as in FIGS. 36 and 37.

The control unit 5 then determines a vibratory condition parameter P according to the following relation.

$$P=(a \cdot V_H)/(b \cdot V_L)$$

where a and b are preselected weighted coefficients respectively.

Figure 38A:
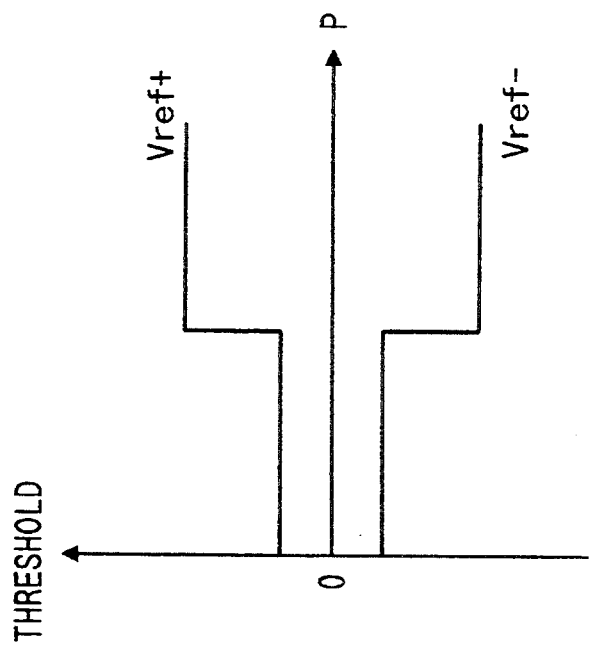
FIGS. 38(a) and 38(b) are graphs each showing a relation between a vibratory condition parameter P and vertical speed threshold values $V_{ref+}$ and $V_{ref-}$.
Figure 38B:
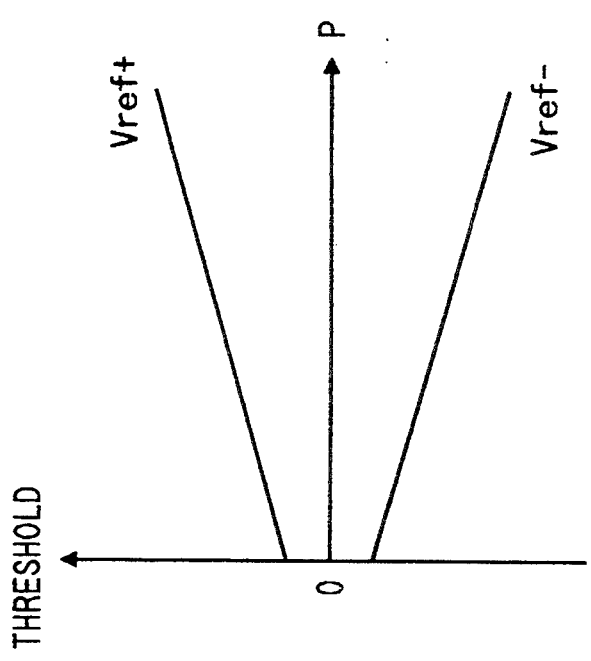

Using the vibratory condition parameter P mathematically derived, the vertical speed threshold values $V_{ref+}$ and $V_{ref-}$ for selecting the damping characteristic modes, as shown in FIG. 6, are determined by lookup using a map, as shown in FIG. 38(a) wherein absolute values of the threshold values $V_{ref+}$ and $V_{ref-}$ are increased linearly according to an increase in the vibratory condition parameter P. The threshold values $V_{ref+}$ and $V_{ref-}$ may alternatively be determined according to the relation, as shown in FIG. 38(b), wherein the threshold values $V_{ref+}$ and $V_{ref-}$ are increased in a stepwise fashion as the vibratory condition parameter P is increased.

Figure 39A:
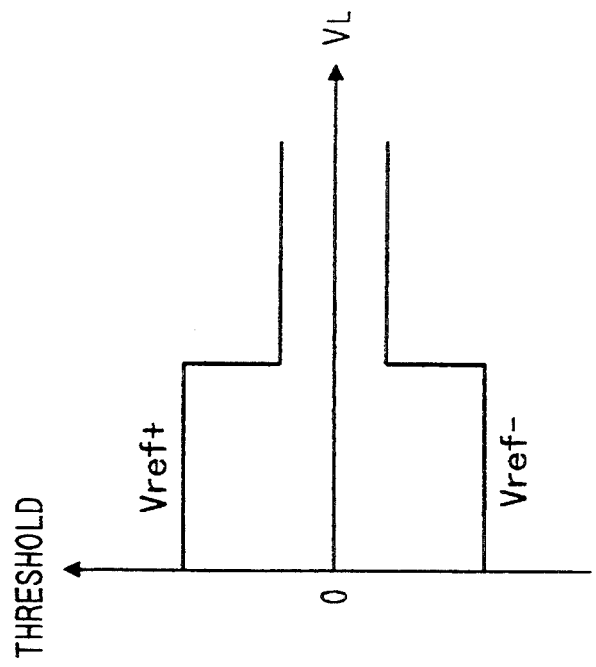
FIGS. 39(a) and 39(b) are graphs each showing a relation between a low-frequency vibration level $V_L$ and vertical speed threshold values $V_{ref+}$ and $V_{ref-}$.
Figure 39B:
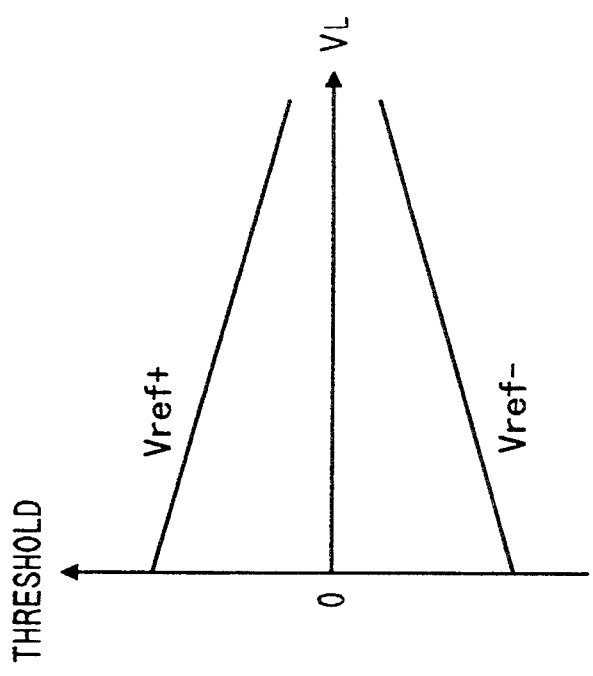

Referring to FIGS. 39(a) and 39(b), a first modification of the above arrangement is shown which includes the low-pass filter 4 only. In the first modification, the vertical speed threshold values $V_{ref+}$ and $V_{ref-}$ are determined based on the low-frequency vibration level $V_L$.

Figure 40A:
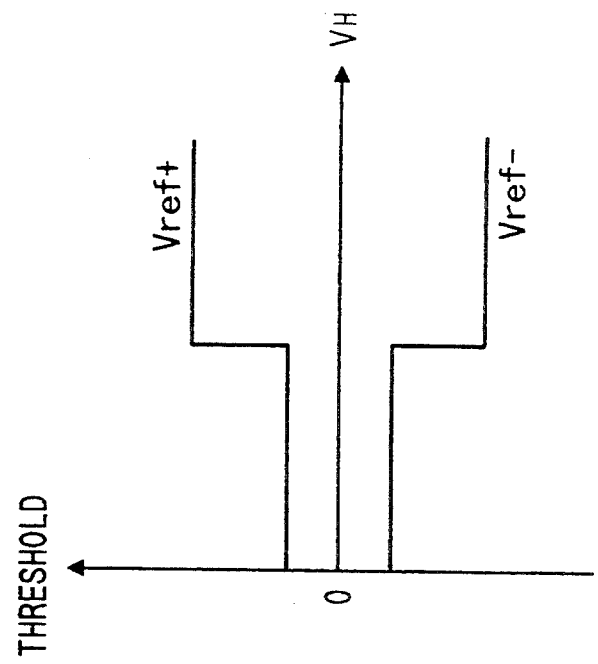
FIGS. 40(a) and 40(b) are graphs each showing a relation between a high-frequency vibration level $V_H$ and vertical speed threshold values $V_{ref+}$ and $V_{ref-}$.
Figure 40B:
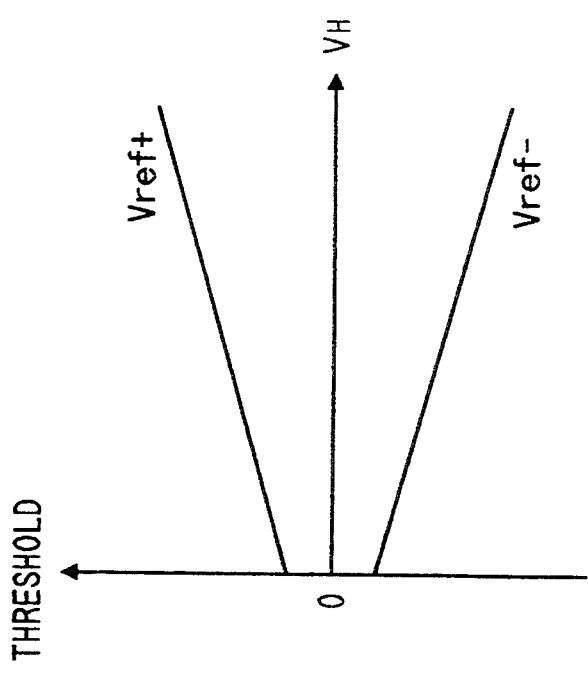

Referring to FIGS. 40(a) and 40(b), a second modification of the above arrangement is shown which includes the high-pass filter 3 only. In this modification, the vertical speed threshold values $V_{ref+}$ and $V_{ref-}$ are determined based on the high-frequency vibration level $V_H$.

Accordingly, with the arrangements, as shown in FIGS. 38(a), 39(a), and 40(a), the selection timing with which the damping characteristic mode (i.e., the H-S, S-H, or S-S modes) is changed constantly according to the vibratory conditions of the vehicle body. Alternatively, the arrangements, as shown in FIGS. 38(b), 39(b), and 40(b), are such that the selection timing with which the damping characteristic mode is changed at a time when the vibratory conditions of the vehicle body exceeds a preselected critical value.

Figure 41:
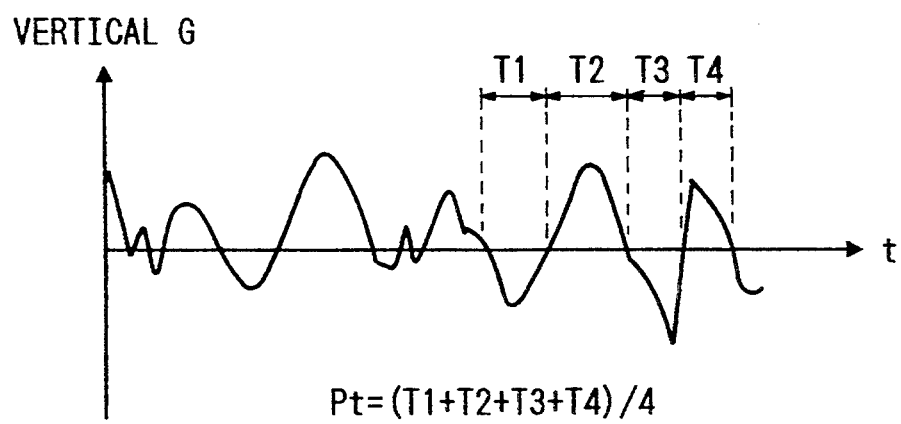
FIG. 41 is a graph which shows a way of determining an average time interval Pt at which high-frequency acceleration passes over zero.
Figure 42B:
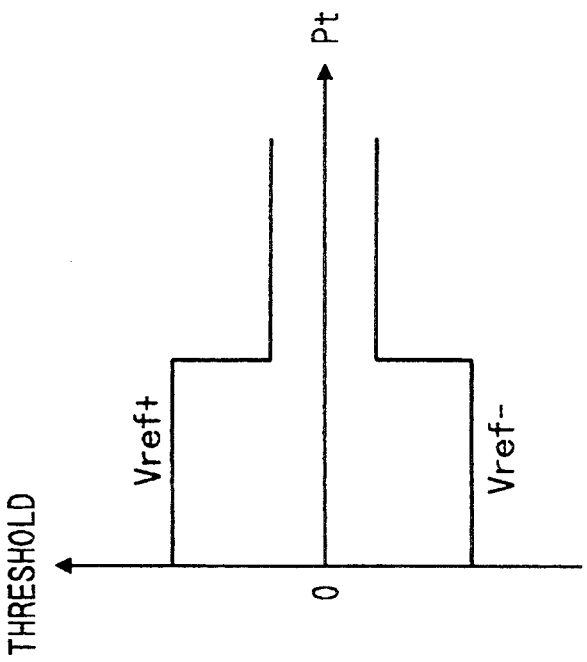
FIGS. 42(a) and 42(b) are graphs each showing a relation between an average time interval Pt and vertical speed threshold values $V_{ref+}$ and $V_{ref-}$.
Figure 42A:
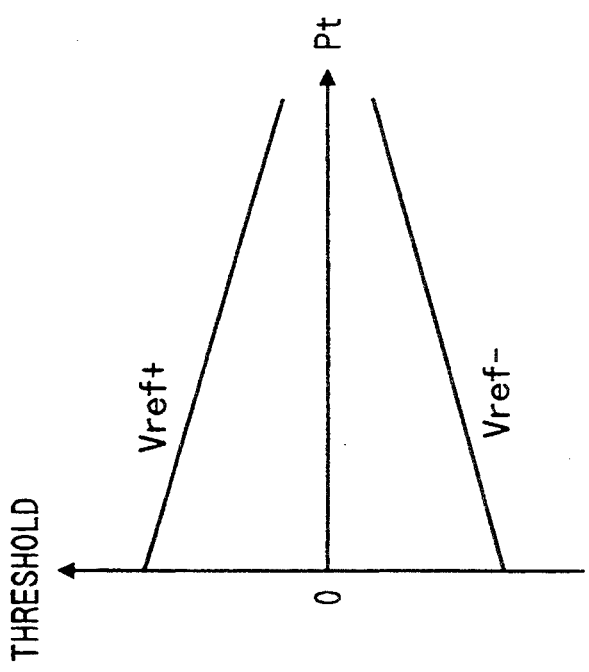
Figure 43B:
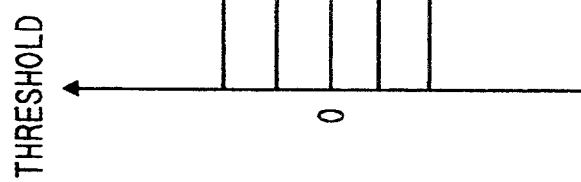
FIGS. 43(a) and 43(b) are graphs each showing a relation between a vibratory condition parameter P and vertical speed threshold values $V_{ref1+}$, $V_{ref2+}$, $V_{ref1-}$, and $V_{ref2-}$.
Figure 43A:
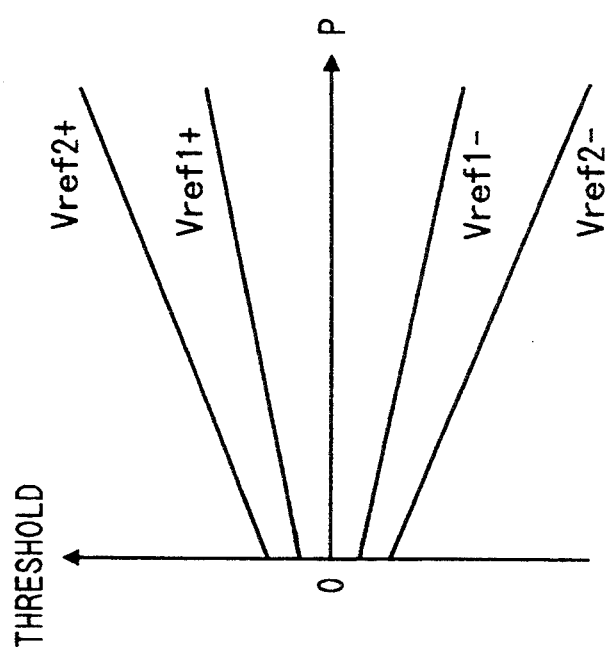
Figure 44B:
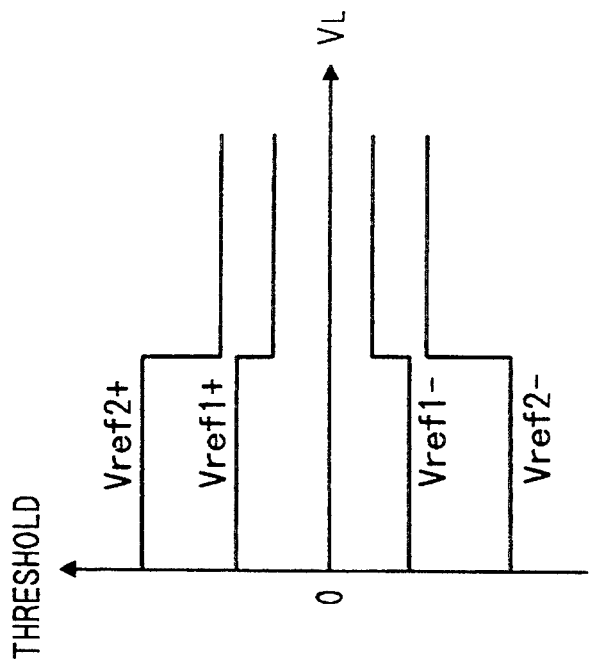
FIGS. 44(a) and 44(b) are graphs each showing a relation between a low-frequency vibration level $V_L$ and vertical speed threshold values $V_{ref1+}$, $V_{ref2+}$, $V_{ref1-}$, and $V_{ref2-}$.
Figure 44A:
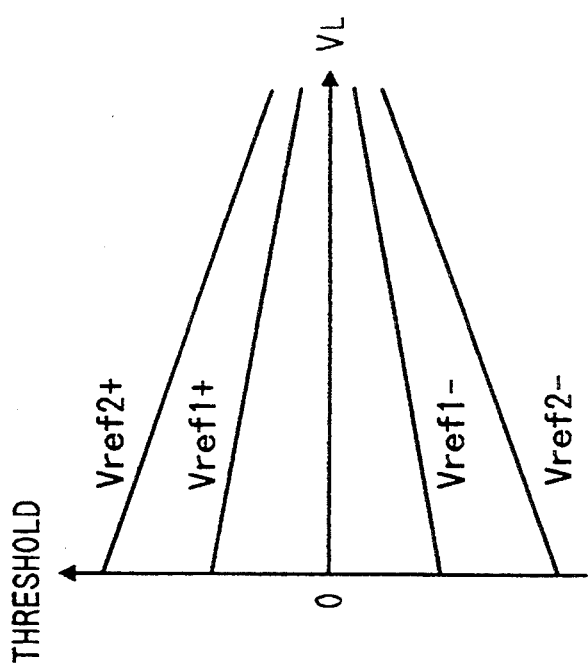
Figure 45A:
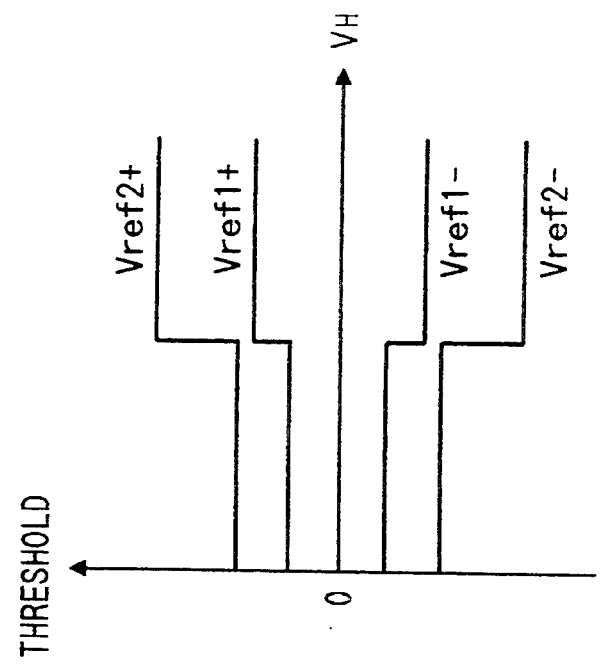
FIGS. 45(a) and 45(b) are graphs each showing a relation between a high-frequency vibration level $V_L$ and vertical speed threshold values $V_{ref1+}$, $V_{ref2+}$, $V_{ref1-}$, and $V_{ref2-}$.
Figure 45B:
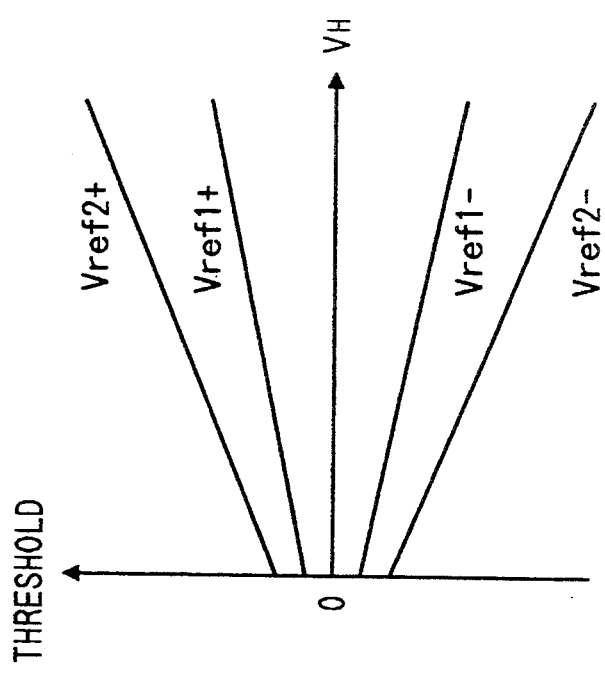
Figure 46B:
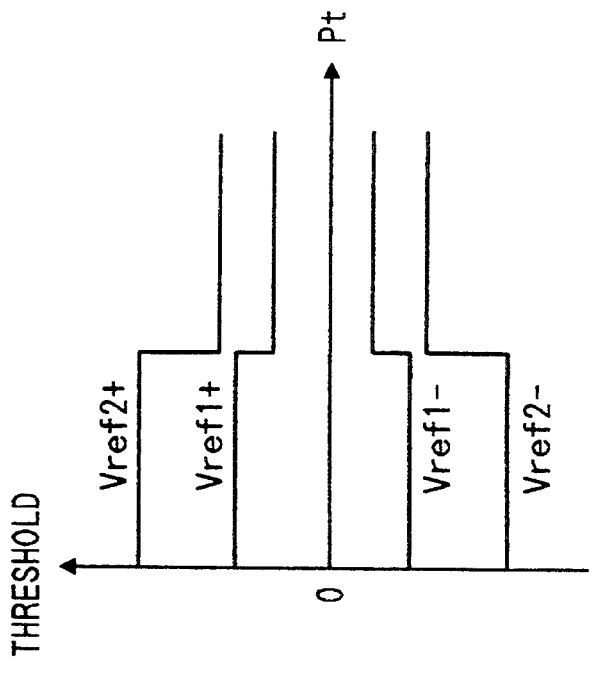
FIGS. 46(a) and 46(b) are graphs each showing a relation between an average time interval Pt and vertical speed threshold values $V_{ref1+}$, $V_{ref2+}$, $V_{ref1-}$, and $V_{ref2-}$.
Figure 46A:
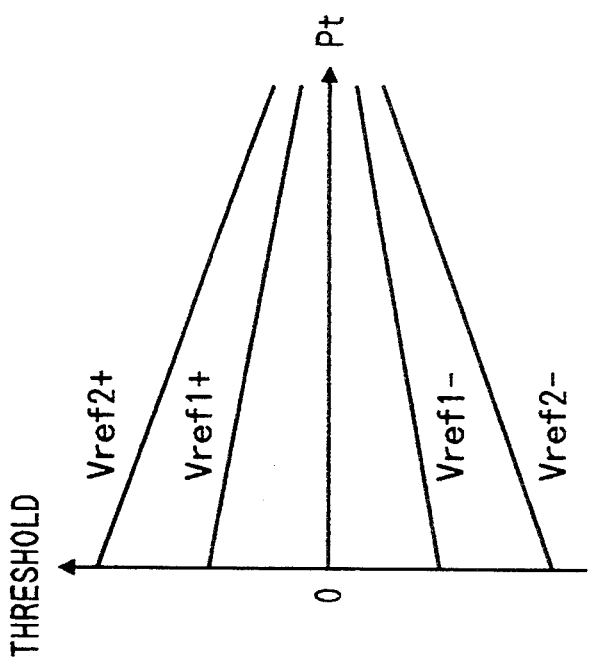

Referring to FIGS. 41, 42(a), and 42(b), a thirteenth embodiment according to the invention is shown which is a modification of the above twelfth embodiment. In this embodiment the control unit 5 samples a plurality of time intervals T1, T2, T3, and T4 at which the vertical acceleration G acting on the vehicle body passes over zero, and averages them to derive an average time interval Pt. The control unit 5, as shown in FIGS. 42(a) and 42(b), then determines the vertical speed threshold values $V_{ref+}$ and $V_{ref-}$ in the same manner as shown in FIGS. 38(a) and 38(b).

The present invention is not limited to the use of a parameter such as vibration frequency of the vehicle body and it is possible to utilize a gain which is varied according to a variation in the vibratory conditions, to modify the vertical speed V without changing the threshold values $V_{ref+}$ and $V_{ref-}$ respectively.

FIGS. 43 to 46 shows modifications which correspond to the ones as shown in FIGS. 38, 39, 40, and 42 respectively which provide a plurality of vertical speed threshold values $V_{ref1+}$, $V_{ref2+}$, $V_{ref1-}$ and $V_{ref2-}$ to modify the damping characteristics more finely, as shown in FIG. 11.

As described above, with the correction of the vertical speed threshold values $V_{ref+}$ and $V_{ref-}$ and the correction of the vertical acceleration or the vertical speed to compensate the threshold values $V_{ref+}$ and $V_{ref-}$, the shock absorber 7 is controlled to assume a smaller damping force during vibration at high frequencies for restricting transmission of vibratory energy to the vehicle body while assuring riding comfort, while a greater damping force is provided during vibration at low frequencies for damping the low-frequency vibrations effectively.

As already mentioned, a damping coefficient of the shock absorber is determined by an angular position $\theta$ of the control valve. Thus, it will be noted that the angular position $\theta$ of the control valve may be compensated in a preselected relation to vibration frequencies of the vehicle body to obtain the same effects as the correction of the vertical speed threshold values $V_{ref+}$ and $V_{ref-}$ and the correction of the vertical acceleration or the vertical speed to compensate the threshold values $V_{ref+}$ and $V_{ref-}$.

For example, in the three-mode type shock absorber, as shown in FIG. 6, wherein the control valve 60 may exhibit three positions over a range of $\theta+$, 0, and $\theta-$, when the vibration frequency represents a higher level, the angular position $\theta$ is set to a smaller value which provides a smaller damping force. In contrast, when the vibration frequency represents a lower level, the angular position $\theta$ is regulated to a greater value which provides a greater damping force.

The above mentioned control is also applicable to the multi-mode shock absorber, as shown in FIG. 11 and the two-mode shock absorber, as shown in FIG. 18.

While the above embodiments utilizes a two-port type shock absorber which includes extension and compression phase fluid passages separate from each ms other, it is possible to use a conventional one-port shock absorber including a single fluid passage to provide substantially the same effects as in the previous embodiments.

When using the one-port shock absorber, it is necessary to modify the damping force during extension of shock absorber operation. For example, in the event that the control, as shown in FIG. 38, is performed using the one-port shock absorber, the shock absorber may be controlled to produce smaller damping forces when the vertical speed V falls in a range between the threshold values $V_{ref+}$ and $V_{ref-}$. When the vertical speed V is above the threshold value $V_{ref+}$, a greater damping force is provided in the extension stroke, while a smaller damping force is produced in the compression stroke. Conversely, when the vertical speed V becomes below the threshold value $V_{ref-}$, a smaller damping force is provided in the extension stroke, while a greater damping force is produced in the compression stroke.

A fourteenth embodiment will be described hereinbelow which is operable to control the damping characteristics using the number of angular position modification chances of the control valve.

This embodiment employs the same shock absorber as in the first embodiment. When the shock absorber serves to dampen vibratory energy transmitted to the vehicle body, a greater damping force is provided, while when allowing vibration of the vehicle body to be created to a certain degree, a smaller damping force is created by the shock absorber.

In operation, when the vertical speed V represents a positive value above the threshold value $V_{ref+}$, the control valve 60 is, as shown in FIG. 5, rotated toward a positive direction ($+\theta$) to have the shock absorber 7 assume the first mode (H-S) wherein the greater damping force is produced during the extension stroke and the smaller damping force is produced during the compression stroke. Under such a condition, when the number of times the damping characteristic is changed to the first mode is increased to cause sprung high-frequency vibrations to give vehicle occupancies firm riding comfort, an angular position of the control valve 60 in a positive direction ($+\theta$) is further modified to a smaller value so that the damping force in the extension stroke is somewhat decreased, resulting in transmission of the high-frequency vibrations to the vehicle body being reduced.

Alternatively, when the vertical speed V represents a negative value over the threshold value $V_{ref-}$, the control valve 60 is, as shown in FIG. 5, rotated toward a negative direction ($-\theta$) to have the shock absorber 7 assume the second mode (S-H) wherein a smaller damping force is produced during the extension stroke and a greater damping force is produced during the compression stroke. Under such a condition, when the number of times the damping characteristic is changed to the second mode is increased, an angular position of the control valve 60 in the negative direction ($-\theta$) is further modified to a smaller value so that the damping force in the extension stroke is somewhat decreased.

When the vertical speed V falls in the range between the threshold values $V_{ref+}$ and $V_{ref-}$, the shock absorber 7 is, as already described, controlled to assume the third mode (S-S).

Figure 48:
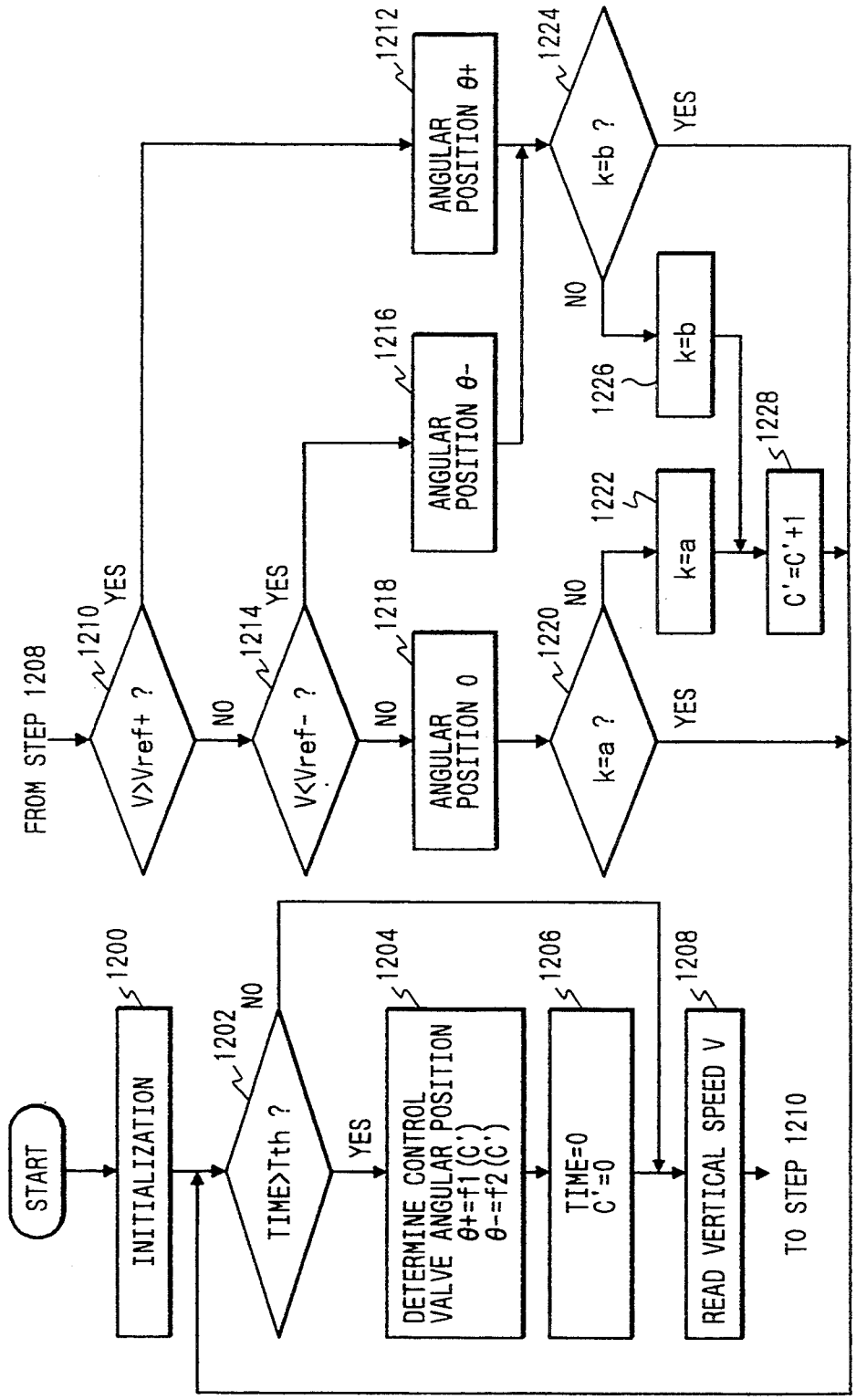
FIG. 48 is a flowchart which shows a program performed by a control unit which modifies an angular position θ of a control valve according to the number of times the damping characteristic mode has been changed.

Referring to FIG. 48, a flowchart is shown which represents a program or sequence of logical steps performed by the control unit 5.

Figure 47:
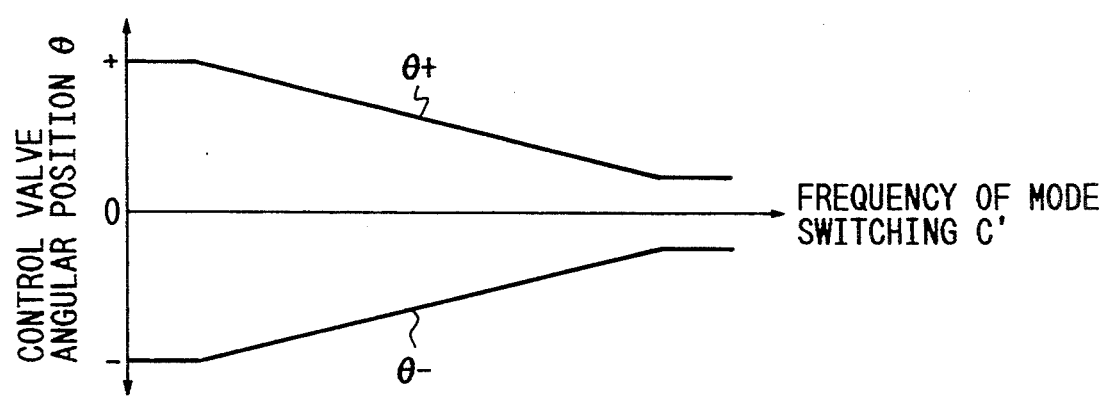
FIG. 47 is a graph which shows a relation between an angular position θ of a control valve of a variable damping force shock absorber and the number of times the damping characteristic mode has been changed.

After initiating the program, the routine proceeds to step 1200 wherein the control unit 5 is initialized. The routine then proceeds to step 1202 wherein it is determined whether or not time TIME after initiating the program reaches a preselected period of time Tth which represents a critical value to terminate counting the frequency of damping characteristic mode switching. If a YES answer is obtained (TIME >Tth), the routine then proceeds to step 1204 wherein an angular position ($+\theta$, $-\theta$) of the control valve 60 is determined in preselected relations (f1(C), f2(C)) to a counter value C', as shown in FIG. 47, which indicates a frequency of damping characteristics mode switching. Afterwards, the routine proceeds to step 1206 wherein the elapsed time TIME and the threshold value Tth are set to zero respectively.

After step 1206 or if a NO answer is obtained in step 1202 (TIME<Tth), the routine then proceeds to step 1208 wherein the vertical speed V is mathematically provided.

The routine then proceeds to step 1210 wherein it is determined whether the vertical speed V is greater than the threshold value $V_{ref+}$ or not. If a YES answer is obtained, the routine then proceeds to step 1212 wherein the control valve 60 is rotated at the angle $\theta+$ determined in step;1204. Alternatively, if a NO answer is obtained in step 1210, the routine then proceeds to speed V is smaller than the threshold value $V_{ref-}$ or not. If a YES answer is obtained, the routine then proceeds to step 1214 wherein it is determined whether the vertical step 1216 wherein the control valve 60 is rotated at the angle $\theta-$ determined in step 1204. On the other hand, if a NO answer is obtained in step 1214, concluding that the vertical speed V is within the range between the threshold values $V_{ref+}$ and $V_{ref-}$ and thus the vehicle body is stable in motion, the routine proceeds to step 1218 wherein the angular position of the control valve 60 is set substantially to zero so that the shock absorber 7 assumes the third mode (S-S) to absorb rapid vibrations from a road surface effectively.

After step 1218, the routine proceeds to step 1220 wherein it is determined whether a constant K represents "a" or not (k=a ?). This determination is made for determining whether a value of the vertical speed V has passed over the threshold values $V_{ref+}$ or $V_{ref-}$ or not, that is, whether the damping characteristics have been switched from the first or second modes to the third mode or not. If a NO answer is obtained, concluding that the damping characteristic mode has been switched, the routine then proceeds to step 1222 wherein the constant k is set to "a". The routine then proceeds to step 1228 wherein the counter value C' is updated (C=C+1).

If a YES answer is obtained in step 1220, concluding that the shock absorber 7 exhibits the same damping characteristic mode as in the previous program cycle, the routine then returns back to step 1220.

After steps 1216 or 1212, the routine proceeds to step 1224 wherein it is determined whether the constant K represents "b" or not (k=b?). This determination is made for determining whether the damping characteristics have been switched from the third mode to the first or second modes or not. If a NO answer is obtained, concluding that the damping characteristic mode has been switched, the routine then proceeds to step 1226 wherein the constant k is set to "b", after which the routine proceeds to step 1228.

As is clear from the above discussion, this embodiment is operable to determine the number of times the damping characteristic mode is switched, or the sprung vertical speed V passes across the threshold values for modifying the damping force of the shock absorber. Therefore, the same effect may be produced as the above arrangements wherein the damping force is modified based on the sprung vibration frequencies.

Figure 49:
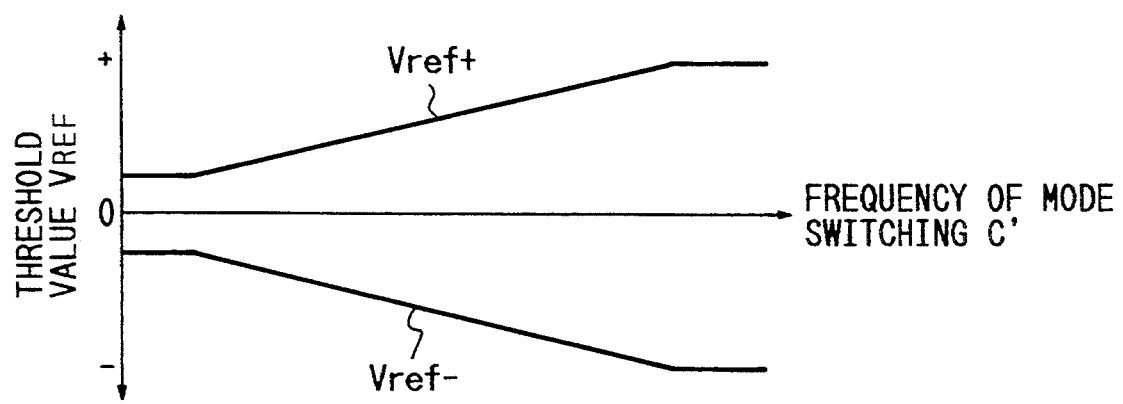
FIG. 49 is a graph which shows a relation between vertical speed threshold values $V_{ref+}$ and $V_{ref-}$ and the number of times the damping characteristic mode has been changed.
Figure 50:
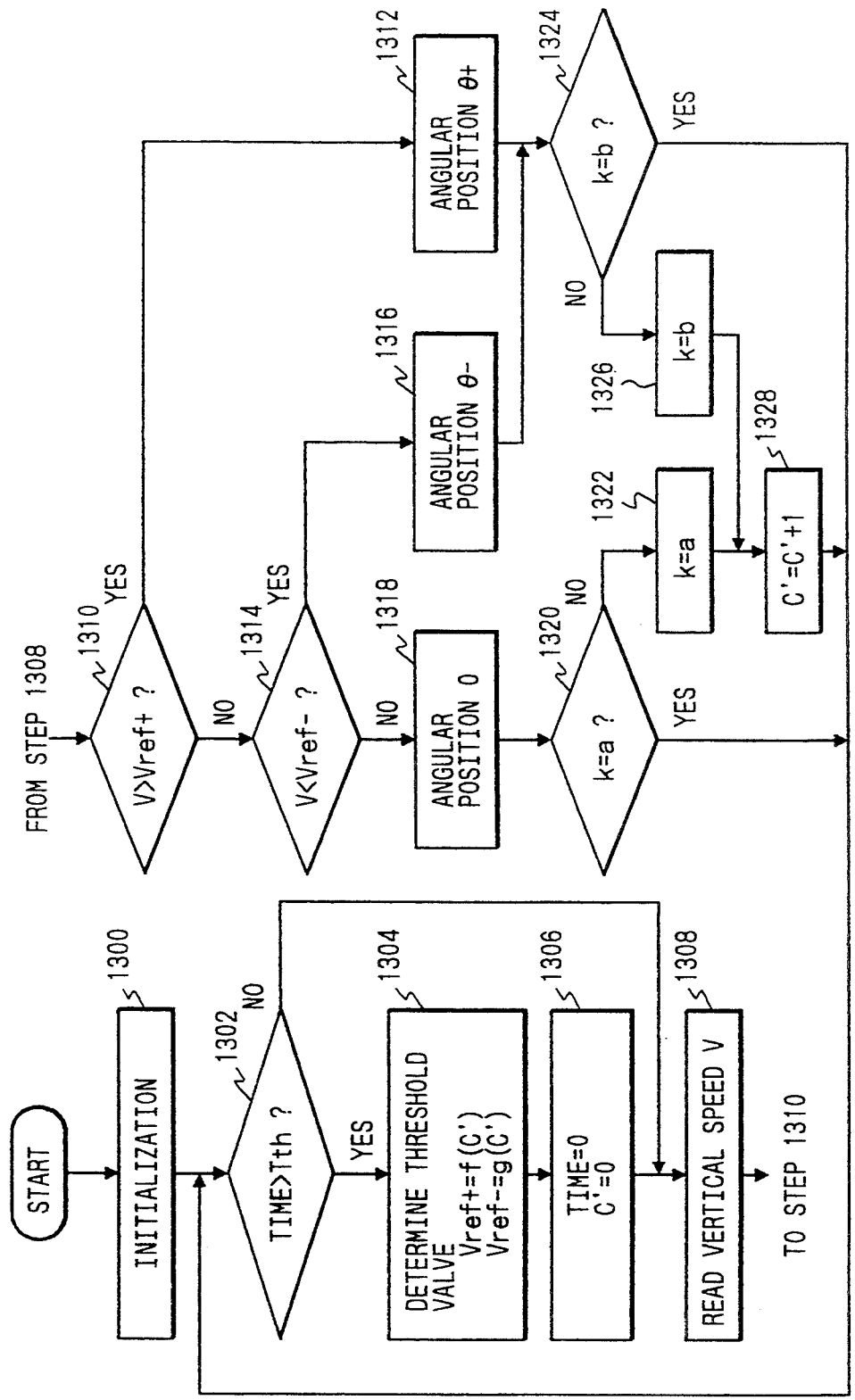
FIG. 50 is a flowchart which shows a program performed by a control unit which modifies vertical speed threshold values $V_{ref+}$ and $V_{ref-}$ according to the number of times the damping characteristic mode has been changed.

Referring to FIGS. 49 and 50, there is shown a vertical speed threshold values $V_{ref+}$ and $V_{ref-}$ are fifteenth embodiment of the present invention wherein the corrected according to the counter value C' indicative of the frequency of damping characteristic mode switching.

In step 1304 of a flowchart, as shown in FIG. 50, the vertical speed threshold values $V_{ref+}$ and $V_{ref-}$ are modified in preselected relations (f(C), g(C)) to the counter value C', as shown in FIG. 49. Therefore, with this arrangement, switching timing from the third mode to the first or second modes is shifted in a direction of a greater vertical speed V. The manner in which the angular position $\theta$ of the control valve 60 (i.e., the damping force) is determined is substantially the same as in the first embodiment.

Figure 51:
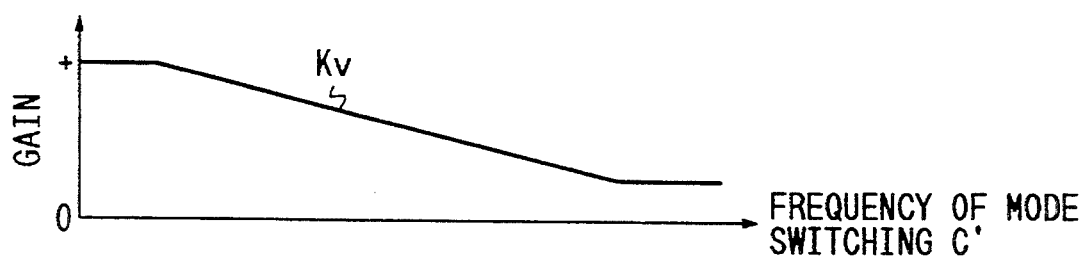
FIG. 51 is a graph which shows a relation between a gain Kv for correcting vertical speed V and the number of times the damping characteristic mode has been changed.

Referring to FIGS. 51 and 52, there is shown a sixteenth embodiment of the invention. This embodiment is substantially similar to the ninth embodiment wherein the vertical speed V is modified based on a preselected vertical speed gain.

In this embodiment, as shown in FIG. 51 and a step 1404 in FIG. 52, a vertical speed gain $K_V$ is determined according to the counter value C'. The vertical speed gain $K_V$ is set to a smaller value as the counter value C' is increased. Thus, according to this embodiment, the switching timing from the third mode to the first or second modes is shifted in the same manner as in the fifteenth embodiment.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, a longitudinal acceleration sensor and/or a lateral acceleration sensor may be provided in a vehicle so that a damping force of the shock absorber is modified based on the outputs from the sensors.

A wheel speed sensor and/or a vehicle speed sensor may be used to modify the damping force of the shock absorber.

A filter which samples a sprung resonance frequency components from sprung vertical acceleration may be provided so that the damping force of the shock absorber is modified based on the output of the fileter.

The shock absorber control system of the invention may independently control the shock absorber disposed on each wheel. In addition, the relation between the vertical speed V and the threshold values $V_{ref+}$ and $V_{ref-}$ may be adjusted according to the degree of rolling and/or pitching motions of the vehicle body.

What is claimed is:

1. A variable damping force shock absorber control system comprising:
a variable damping force shock absorber including a cylinder filled with working fluid, a piston, slidably disposed within said cylinder, defining upper and lower working chambers, a first fluid passage allowing said working fluid to flow only in a direction from said upper to said lower chambers, a second fluid passage allowing said working fluid to flow only in a direction from said lower to said upper chambers, and valve means, disposed in said first and second fluid passages, for modifying a passage area of one of said first and second fluid passages while maintaining the other constant;
vibration level determining means for determining a vibration level of a sprung portion of a vehicle body;
vertical speed determining means for determining a vertical speed of the sprung portion of the vehicle body;
mode selecting means for actuating said valve means of said variable damping force shock absorber to select one of first, second, and third modes of operation of said shock absorber according to said vertical speed determined by said vertical speed determining means, said first mode being such that a damping force during an extension stroke of said shock absorber is modified to a greater value while maintaining a damping force during a compression stroke at a smaller value, said second mode being such that said damping force during said compression stroke of said shock absorber is modified to a greater value while maintaining said damping force during said extension stroke at a smaller value, said third mode being such that said damping forces during both said compression stroke and said extension stroke are set to said smaller values; and
damping characteristic modifying means for modifying damping characteristics during said extension stroke in said first mode and during said compression stroke in said second mode according to a variation in said vibration level determined by said vibration level determining means, said damping characteristic modifying means modifying a threshold value relative to said vertical speed determined by said vertical speed determining means in each mode selected by said mode selecting means.

2. A variable damping force shock absorber control system as set forth in claim 1, wherein said damping characteristic modifying means decreases said threshold value as said vibration level determined by said vibration level determining means becomes great.

3. A variable damping force shock absorber control system as set forth in claim 1, wherein said damping characteristic modifying means compares said vibration level determined by said vibration level determining means with a preselected value to determine said threshold value relative to said vertical speed determined by said vertical speed determining means in each mode selected by said mode selecting means according to a result of said comparison.

4. A variable damping force shock absorber control system comprising:
a variable damping force shock absorber including a cylinder filled with working fluid, a piston, slidably disposed within said cylinder, defining upper and lower working chambers, a first fluid passage allowing said working fluid to flow only in a direction from said upper chamber to said lower chamber, a second fluid passage, having a preselected greater passage area, allowing said working fluid to flow only in a direction from said lower chamber to said upper chamber, and value means, disposed in said first and second fluid passages, for modifying a passage area of said first fluid passage;

vibration level determining means for determining a vibration level of a sprung portion of a vehicle body;

vertical speed determining means for determining vertical speed of said sprung portion of said vehicle body;

mode selecting means for actuating said valve means of said variable damping force shock absorber to switch between first and third modes of operation of said shock absorber according to said vertical speed determined by said vertical speed determining mean, said first mode being such that a damping force during an extension stroke of said shock absorber is modified to a greater value while maintaining a damping force during a compression stroke at a smaller value, said third mode being such that said damping forces during both said compression and extension strokes are set to said smaller values; and damping characteristic modifying means for modifying damping characteristics during said extension stroke in said first mode according to a variation in said vibration level determined by said vibration level determining means, said damping characteristic modifying means modifying a threshold value relative to said vertical speed determined by said vertical speed determining means in each mode selected by said mode selecting means.

5. A variable damping force shock absorber control system as set forth in claim 4, wherein said damping characteristic modifying means decreases said threshold value as said vibration level determined by said vibration level determining means becomes great.

6. A variable damping force shock absorber control system as set forth in claim 4, wherein said damping characteristic modifying means compares said vibration level determined by said vibration level determining means with a preselected value to determine said threshold value relative to said vertical speed determined by said vertical speed determining means in each mode selected by said mode selecting means according to a result of said comparison.

7. A variable damping force shock absorber control system comprising:

a variable damping force shock absorber including a cylinder filled with working fluid, a piston, slidably disposed within said cylinder, defining upper and lower working chambers, a first fluid passage allowing said working fluid to flow only in a direction from said upper to said lower chambers, a second fluid passage allowing said working fluid to flow only in a direction from said lower to said upper chambers, and valve means, disposed in said first and second fluid passages, for modifying a passage area of one of said first and second fluid passages while maintaining the other constant;

vibration level determining means for determining a vibration level of a sprung portion of a vehicle body;

vertical speed determining means for determining a vertical speed of the sprung portion of the vehicle body;

mode selecting means for actuating said valve means of said variable damping force shock absorber to select one of first, second, and third modes of operation of said shock absorber according to said vertical speed determined by said vertical speed determining means, said first mode being such that a damping force during an extension stroke of said shock absorber is modified to a greater value while maintaining a damping force during a compression stroke at a smaller value, said second mode being such that said damping force during said compression stroke of said shock absorber is modified to a greater value while maintaining said damping force during said extension stroke at a smaller value, said third mode being such that said damping forces during both said compression stroke and said extension stroke are set to said smaller values; and damping characteristic modifying means for modifying damping characteristics during said extension stroke in said first mode and during said compression stroke in said second mode according to a variation in said vibration level determined by said vibration level determining means, said damping characteristic modifying means modifying said vertical speed determined by said vertical speed determining means in each mode selected by said mode selecting means.

8. A variable damping force shock absorber control system as set forth in claim 7, wherein said damping characteristic modifying means corrects said vertical speed to a greater value as said vibration level determined by said vibration level determining means becomes great.

9. A variable damping force shock absorber control system as set forth in claim 7, wherein said damping characteristic modifying means compares said vibration level determined by said vibration level determining means with a preselected value to determine a correction value of said vertical speed determined by said vertical speed determining means in each mode selected by said mode selecting means according to a result of said comparison.

10. A variable damping force shock absorber control system comprising:

a variable damping force shock absorber including a cylinder filled with working fluid, a piston, slidably disposed within said cylinder, defining upper and lower working chambers, a first fluid passage allowing said working fluid to flow only in a direction from said upper chamber to said lower chamber, a second fluid passage, having a preselected greater passage area, allowing said working fluid to flow only in a direction from said lower chamber to said upper chamber, and value means disposed in said first and second fluid passages, for modifying a passage area of said first fluid passage;

vibration level determining means for determining a vibration level of a sprung portion of a vehicle body;

vertical speed determining means for determining a vertical speed of said sprug portion of said vehicle body;

mode selecting means for actuating said valve means of said variable damping force shock absorber to switch between first and third modes of operation of said shock absorber according to said vertical speed determined by said vertical speed determining means, said first mode being such that a damping force during an extension stroke of said shock absorber is modified to a greater value while maintaining a damping force during a compression stroke at a smaller value, said third mode being such that said damping forces during both said compression and extension strokes are set to said smaller values; and damping characteristic modifying means for modifying damping characteristics during said extension stroke in said first mode according to a variation in said vibration level determined by said vibration level determining means, said damping characteristic modifying means modifying said vertical speed determined by said vertical speed determining means in each mode selected by said mode selecting means.

11. A variable ,damping force shock absorber control system as set forth in claim 10, wherein said damping characteristic modifying means corrects said vertical speed to a greater value as said vibration level determined by said vibration level determining means becomes great.

12. A variable damping force shock absorber control system as set forth in claim 10, wherein said damping characteristic modifying means compares said vibration level determined by said vibration level determining means with a preselected value to determine a correction value of said vertical speed determined by said vertical speed determining means in each mode selected by said mode selecting means according to a result of said comparison.

13. A variable damping force shock absorber control system comprising:

a variable damping force shock absorber including a cylinder filled with working fluid, a piston, slidably disposed within the cylinder, defining upper and lower working chambers, a first fluid passage allowing said working fluid to flow only in a direction from said upper chamber to said lower chamber, a second fluid passage allowing said working fluid to flow only in a direction from said lower chamber to said upper chamber, and valve means, disposed in said first and second fluid passages, for modifying a passage area of one of said first and second fluid passages while maintaining the other constant;

vibration level determining means for determining a vibration level of a sprung portion of a vehicle body;

vertical speed determining means for determining a vertical speed of said sprung portion of said vehicle;

mode selecting means for actuating said valve means of said variable damping force shock absorber to select one of first, second, and third modes of operation of said shock absorber according to said vertical speed determined by said vertical speed determining means, said first mode being such that a damping force during an extension stroke of said shock absorber is modified to a greater value while maintaining a damping force during a compression stroke at a smaller value, said second mode being such that said damping force during said compression stroke of said shock absorber is modified to a greater value while maintaining said damping force during said extension stroke at a smaller value, said third mode being such that said damping forces during both said compression stroke and said extension stroke are set to said smaller values; and damping characteristics modifying means for modifying characteristics during said extension stroke in said first mode and during said compression stroke in said second mode according to a variation in said vibration level determined by said vibration level determining means;

said vibration level determining means sampling high-frequency components and low-frequency components in sprung vertical acceleration;

said damping characteristic modifying means determining at least two threshold values of said vertical speed in a preselected relation to said high-frequency components and said low-frequency components in said sprung vertical acceleration sampled by said vibration level determining means, said at least two threshold values defining said first, second, and third modes of operation of said shock absorbers; and said mode selecting means selecting one of said first, second, and third modes based on a comparison between said vertical speed and said threshold values.

14. A variable damping force shock absorber control system comprising:

a variable damping force shock absorber including a cylinder filled with working fluid L a piston, slidably disposed within said cylinder, defining upper and lower working chambers, a first fluid passage allowing said working fluid to flow only in a direction from said upper chamber to said lower chamber, a second fluid passage, having a preselected greater passage area, allowing said working fluid to flow only in a direction from said lower chamber to said upper chamber, and value means, disposed in said first and second fluid passages, for modifying a passage area of said first fluid passage:

vibration level determining means for determining a vibration level of a sprung portion of a vehicle body:

vertical speed determining means for determining a vertical speed of said sprung portion of said vehicle body;

mode selecting means for actuating said value means of said variable damping force shock absorber to switch between first and third modes of operation of said shock absorber according to said vertical speed determined by said vertical speed determining means, said first mode being such that a damping force during an extension stroke of said shock absorber is modified to a greater value while maintaining a damping force during a compression stroke at a smaller value, said third mode being such that said damping forces during both said compression stroke and said extension stroke are set to said smaller values; and damping characteristics modifying means for modifying characteristics during said extension stroke in said first mode according to a variation in said vibration level determined by said vibration level determining means;

said vibration level determining means sampling high-frequency components and low-frequency components in sprung vertical acceleration; and said damping characteristic modifying means determining at least two threshold values of said vertical speed in a preselected relation to said high-frequency components and said low-frequency components in said sprung vertical acceleration sampled by said vibration level determining means, said threshold values defining said first and third modes, said mode selecting means switching between said first and third modes based on a comparison between said vertical speed and said threshold values.

15. A variable damping force shock absorber control system for an automotive vehicle comprising:
a variable damping force shock absorber designed to have a plurality of damping modes of operation each assuming different damping characteristics;
vertical acceleration determining means for determining vertical acceleration acting on a sprung portion of said vehicle to provide a signal indicative thereof;
vertical speed determining means for determining a vertical speed of said sprung portion of said vehicle to provide a signal indicative thereof;
vibratory condition determining means, responsive to said signal from said vertical acceleration determining means, for determining a vibratory condition indicative parameter as a function of a variation in amplitude of said vertical acceleration, said vibratory condition determining means setting said vibratory condition indicative parameter to a first value indicative of a magnitude of said variation in amplitude of said vertical acceleration when said vertical acceleration determined by said vertical acceleration determining means exceeds a first vertical acceleration threshold value and to a second value greater than said first value when said vertical acceleration exceeds a second vertical acceleration threshold value greater than said first vertical acceleration threshold value;
mode selecting means, responsive to said signal from said vertical speed determining means, for selecting one of said plurality of damping modes of operation of said variable damping force shock absorber according to said vertical speed; and
damping force modifying means for modifying a damping force in each damping mode of operation of said variable damping force shock absorber in a preselected relation to said first and second values of said vibratory condition indicative parameter determined by said vibrator condition determining means.

16. A variable damping force shock absorber control system as set forth in claim 15, wherein said vibratory condition determining means sets said vibratory condition indicative parameter to a third value different from said first and second values when said vertical acceleration determined by said vertical acceleration determining means exceeds a third vertical acceleration threshold value in a direction opposite said first and second vertical acceleration threshold values across zero.

17. A variable damping force shock absorber control system for an automotive vehicle comprising:
a variable damping force shock absorber adapted to have a plurality of damping modes of operation each assuming different damping characteristics;
vertical acceleration determining means for determining vertical acceleration acting on a sprung portion of the vehicle to provide a signal indicative thereof;
vertical speed determining means for determining vertical speed of the sprung portion of the vehicle to provide a signal indicative thereof;
vibratory condition determining means, responsive to the signal from said vertical acceleration determining means, for determining a vibratory condition indicative parameter as a function of a variation in amplitude of the vertical acceleration;
mode selecting means, responsive to the signal from said vertical speed determining means, for selecting one of the plurality of damping modes of operation of said variable damping force shock absorber according to the vertical speed; and
damping force modifying means for modifying a damping force in each damping mode of operation of the variable damping force shock absorber in a preselected relation to the vibratory condition indicative parameter determined by said vibratory condition determining means, wherein
said mode selecting means switches to another damping mode when the vertical speed exceeds a preselected vertical speed threshold value, and wherein
said vertical speed threshold value is modified in a preselected relation to said vibratory condition indicative parameter.

18. A variable damping force shock absorber control system comprising:
a variable damping force shock absorber adapted to have a plurality of damping modes of operation each assuming different damping characteristics;
vertical accelerating determining means for determining a vertical acceleration acting on a sprung portion of a vehicle to provide a signal indicative thereof;
vertical speed determining means for determining a vertical speed of said sprung portion of said vehicle to provide a signal indicative thereof;
vibratory condition determining means, responsive to said signal from said vertical acceleration determining means, for determining a vibratory condition indicative parameter as a function of a variation in amplitude of said vertical acceleration;
mode selecting means, responsive to said signal from said vertical speed determining means, for selecting one of said plurality of damping modes of operation of said variable damping force shock absorber according to said vertical speed;
damping force modifying means for modifying a damping force in each damping mode of operation of said variable damping force shock absorber in a preselected relation to said vibrators condition indicative parameter determined by said vibratory condition determining means;
high-frequency acceleration sampling means for sampling high-frequency components of said vertical acceleration higher than a preselected value; and
low-frequency acceleration sampling means for sampling low-frequency components of said vertical acceleration lower than a preselected value;
said vibratory condition determining means sampling a plurality of peak levels of said high-frequency components each being developed in a preselected period of time to determine an average high-frequency acceleration level, said vibratory condition determining means further sampling a plurality of peak levels of said low-frequency components each being developed in a preselected period of time to determine an average low-frequency acceleration level, said vertical speed threshold value being modified in a preselected relation to said average high-frequency acceleration level and said average low-frequency acceleration level.

19. A variable damping force shock absorber control system as set forth in claim 18, wherein a plurality of vertical speed threshold values are provided, said damping force modifying means modifying said damping force in each damping mode of operation of said variable damping force shock absorber to a preselected value which corresponds to said vertical speed threshold value over which said vertical speed has passed, each vertical speed threshold value being modified in a preselected relation to said average high-frequency acceleration level and said average low-frequency acceleration level.

20. A variable damping force shock absorber control system comprising:

a variable damping force shock absorber adapted to have a plurality of damping modes of operation each assuming different damping characteristics;

vertical accelerating determining means for determining a vertical acceleration acting on a sprung portion of a vehicle to provide a signal indicative thereof;

vertical speed determining means for determining a vertical speed of said sprung portion of said vehicle to provide a signal indicative thereof;

vibratory condition determining means, responsive to said signal from said vertical acceleration determining means, for determining a vibratory condition indicative parameter as a function of a variation in amplitude of said vertical acceleration;

mode selecting means, responsive to said signal from said vertical speed determining means, for selecting one of said plurality of damping modes of operation of said variable damping force shock absorber according to said vertical speed;

damping force modifying means for modifying a damping force in each damping mode of operation of said variable damping force shock absorber in a preselected relation to said vibratory condition indicative parameter determined by said vibratory condition determining means; and low-frequency acceleration sampling means for sampling low frequency components of said vertical acceleration lower than a preselected value;

said vibratory condition determining means sampling a plurality of peak levels of said low-frequency components each being developed in a preselected period of time to determine an average low-frequency acceleration level, said vertical speed threshold value being modified in a preselected relation to said average low-frequency acceleration level.

21. A variable damping force shock absorber control system as set forth in claim 20, wherein a plurality of vertical speed threshold values are provided, said damping force modifying means modifying said damping force in each damping mode of operation of said variable damping force shock absorber to a preselected value which corresponds to said vertical speed threshold value over which said vertical speed has passed, each vertical speed threshold value being modified in a preselected relation to said average low-frequency acceleration level.

22. A variable damping force shock absorber control system comprising:

a variable damping force shock absorber adapted to have a plurality of damping modes of operation each assuming different damping characteristics;

vertical accelerating determining means for determining a vertical acceleration acting on a sprung portion of a vehicle to provide a signal indicative thereof;

vertical speed determining means for determining a vertical speed of said sprung portion of said vehicle to provide a signal indicative thereof;

vibratory condition determining means, responsive to said signal from said vertical acceleration determining means, for determining a vibratory condition indicative parameter as a function of a variation in amplitude of said vertical acceleration;

mode selecting means, responsive to said signal from said vertical speed determining means, for selecting one of said plurality of damping modes of operation of said variable damping force shock absorber according to said vertical speed;

damping force modifying means for modifying a damping force in each damping mode of operation of said variable damping force shock absorber in a preselected relation to said vibratory condition indicative parameter determined by said vibratory condition determining means; and high-frequency acceleration sampling means for sampling high-frequency components of said vertical acceleration higher than a preselected value;

said vibratory condition determining means sampling a plurality of peak levels of said high-frequency components each being developed in a preselected period of time to determine an average high-frequency acceleration level, said vertical speed threshold value being modified in a preselected relation to said average high-frequency acceleration level.

23. A variable damping force shock absorber control system as set forth in claim 22, wherein a plurality of vertical speed threshold values are provided, said damping force modifying means modifying said damping force in each damping mode of operation of said variable damping force shock absorber to a preselected value which corresponds to said vertical speed threshold value over which said vertical speed has passed, each vertical speed threshold value being modified in a preselected relation to said average high-frequency acceleration level.

24. A variable damping force shock absorber control system comprising:

a variable damping force shock absorber adapted to have a plurality of damping modes of operation each assuming different damping characteristics;

vertical accelerating determining means for determining a vertical acceleration acting on a sprung portion of a vehicle to provide a signal indicative thereof;

vertical speed determining means for determining a vertical speed of said sprung portion of said vehicle to provide a signal indicative thereof;

vibratory condition determining means, responsive to said signal from said vertical acceleration determining means, for determining a vibratory condition indicative parameter as a function of a variation in amplitude of said vertical acceleration;

mode selecting means, responsive to said signal from said vertical speed determining means, for selecting one of said plurality of damping modes of operation of said variable damping force shock absorber according to said vertical speed;

damping force modifying means for modifying a damping force in each damping mode of operation of said variable damping force shock absorber in a preselected relation to said vibratory condition indicative parameter determined by said vibratory condition determining means;

high-frequency acceleration sampling means for sampling high-frequency components of said vertical acceleration higher than a preselected value; and low-frequency acceleration sampling means for sampling low-frequency components of said vertical acceleration lower than a preselected value;

said vibratory condition determining means sampling a plurality of peak levels of said high-frequency components to determine an average high-frequency acceleration level, said vibratory condition determining means further sampling a plurality of peak levels of said low-frequency components each being developed in a preselected period of time to determine an average low-frequency acceleration level, said vertical speed threshold value being modified in a preselected relation to said average high-frequency acceleration level and said average low-frequency acceleration level.

25. A variable damping force shock absorber control system comprising:

a variable damping force shock absorber adapted to have a plurality of damping modes of operation each assuming different damping characteristics;

vertical accelerating determining means for determining a vertical acceleration acting on a sprung portion of a vehicle to provide a signal indicative thereof;

vertical speed determining means for determining a vertical speed of said sprung portion of said vehicle to provide a signal indicative thereof;

vibratory condition determining means, responsive to said signal from said vertical acceleration determining means, for determining a vibratory condition indicative parameter as a function of a variation in amplitude of said vertical acceleration;

mode selecting means, responsive to said signal from said vertical speed determining means, for selecting one of said plurality of damping modes of operation of said variable damping force shock absorber according to said vertical speed; and damping force modifying means for modifying a damping force in each damping mode of operation of said variable damping force shock absorber in a preselected relation to said vibratory condition indicative parameter determined by said vibratory condition determining means;

said vibratory condition determining means sampling time intervals at which said vertical acceleration passes across zero to determine an average time interval, said vertical speed threshold value being modified in a preselected relation to said average time interval.

26. A variable damping force shock absorber control system as set forth in claim 25, wherein a plurality of vertical speed threshold values are provided, said damping force modifying means modifying said damping force in each damping mode of operation of said variable damping force shock absorber to a preselected value which corresponds to said vertical speed threshold value over which said vertical speed has passed, each vertical speed threshold value being modified in a preselected relation to said average time interval.

27. A variable damping force shock absorber control system comprising:

a variable damping force shock absorber adapted to have a plurality of damping modes of operation each assuming different damping characteristics;

vertical accelerating determining means for determining a vertical acceleration acting on a sprung portion of a vehicle to provide a signal indicative thereof;

vertical speed determining means for determining a vertical speed of said sprung portion of said vehicle to provide a signal indicative thereof;

vibratory condition determining means, responsive to said signal from said vertical acceleration determining means, for determining a vibratory condition indicative parameter as a function of a variation in amplitude of said vertical acceleration;

mode selecting means, responsive to said signal from said vertical speed determining means, for selecting one of said plurality of damping modes of operation of said variable damping force shock absorber according to said vertical speed; and damping force modifying means for modifying a damping force in each damping mode of operation of said variable damping force shock absorber in a preselected relation to said vibratory condition indicative parameter determined by said vibratory condition determining means;

said vibratory condition determining means counting a number of times said damping mode has changed, said damping force modifying means decreasing said damping force in each damping mode of operation of said variable damping force shock absorber to a preselected degree as a counter value indicative of said number of times said damping mode has changed is increased.

28. A variable damping force shock absorber control system comprising:

a variable damping force shock absorber adapted to have a plurality of damping modes of operation each assuming different damping characteristics;

vertical accelerating determining means for determining a vertical acceleration acting on a sprung portion of a vehicle to provide a signal indicative thereof;

vertical speed determining means for determining a vertical speed of said sprung portion of said vehicle to provide a signal indicative thereof;

vibratory condition determining means, responsive to said signal from said vertical acceleration determining means, for determining a vibratory condition indicative parameter as a function of a variation in amplitude of said vertical acceleration;

mode selecting means responsive to said signal from said vertical speed determining means, for selecting one of said plurality of damping modes of operation of said variable damping force shock absorber according to said vertical speed, said mode selecting means switching to another one of said plurality of damping modes when said vertical speed exceeds a preselected vertical speed threshold value; and damping force modifying means for modifying a damping force in each damping mode of operation of said variable damping force shock absorber in a preselected relation to said vibratory condition indicative parameter determined by said vibratory condition determining means;

said vibratory condition determining means counting a number of times said damping mode has changed, said preselected vertical speed threshold value being increased as a counter value indicative of said number of times said damping mode has changed is increased.

29. A variable damping force shock absorber control system comprising:
   a variable damping force shock absorber adapted to have a plurality of damping modes of operation each assuming different damping characteristics;
   vertical accelerating determining means for determining a vertical acceleration acting on a sprung portion of a vehicle to provide a signal indicative thereof;
   vertical speed determining means for determining a vertical speed of said sprung portion of said vehicle to provide a signal indicative thereof, said vertical speed being corrected by a preselected gain;
   vibratory condition determining means, responsive to said signal from said vertical acceleration determining means, for determining a vibratory condition indicative parameter as a function of a variation in amplitude of said vertical acceleration;
   mode selecting means, responsive to said signal from said vertical speed determining means, for selecting one of said plurality of damping modes of operation of said variable damping force shock absorber according to said vertical speed; and
   damping force modifying means for modifying a damping force in each damping mode of operation of said variable damping force shock absorber in a preselected relation to said vibratory condition indicative parameter determined by said vibratory condition determining means;
   said vibratory condition determining means counting a number of times said damping mode has changed, said preselected gain being decreased as a counter value indicative of said number of times said damping mode has changed is increased.

30. A variable damping force shock absorber control system for an automotive vehicle comprising:
   a variable damping force shock absorber having a plurality of damping modes of operation each assuming different damping characteristics;
   vertical acceleration determining means for determining a vertical acceleration acting on a sprung portion of said vehicle to provide a signal indicative thereof;
   vertical speed determining means for determining a vertical speed of said sprung portion of said vehicle to provide a signal indicative thereof;
   vibratory condition determining means, responsive to said signal from said vertical acceleration determining means, for determining a vibratory condition indicative parameter as a function of a variation in amplitude of said vertical acceleration, said vibratory condition determining means, when said vertical acceleration exceeds a preselected positive vertical acceleration threshold value, setting said vibratory condition indicative parameter to said positive vertical acceleration threshold value as indicating a magnitude of said vibratory condition;
   mode selecting means, responsive to said signal from said vertical speed determining means, for selecting one of said plurality of damping modes of operation of said variable damping force shock absorber according to said vertical speed; and
   damping force modifying means for modifying a damping force in each damping mode of operation of said variable damping force shock absorber based on said vibratory condition indicative parameter determined by said vibratory condition determining means.

31. A variable damping force shock absorber as set forth in claim 30, wherein said vibratory condition determining means, when said vertical acceleration further exceeds a preselected second positive vertical acceleration threshold value greater than said positive vertical acceleration threshold value, sets said vibratory condition indicative parameter to a second positive vertical acceleration threshold value as indicating a magnitude of said vibratory condition greater than that indicated by said positive vertical acceleration threshold value.

32. A variable damping force shock absorber as set forth in claim 31, wherein said vibratory condition determining means, when said vertical acceleration changes below a preselected negative vertical acceleration threshold value, sets said vibratory condition indicative parameter to a negative vertical acceleration threshold value as indicating a magnitude of said vibratory condition.

33. A variable damping force shock absorber as set forth in claim 32, wherein said preselected positive vertical acceleration threshold value, said second positive vertical acceleration threshold value and said negative vertical acceleration threshold value are changed to zero at a given rate.

34. A variable damping force shock absorber as set forth in claim 31, wherein said preselected positive vertical acceleration threshold value and said second positive vertical acceleration threshold value are changed to zero at a given rate.

35. A variable damping force shock absorber as set forth in claim 30, wherein said preselected positive vertical acceleration threshold value is changed to zero at a given rate.

* * * * *